US00RE49946E

(19) United States
(12) Reissued Patent
Douglas et al.

(10) Patent Number: US RE49,946 E
(45) Date of Reissued Patent: Apr. 30, 2024

(54) RESPONSIVE WHOLE PATIENT CARE COMPRESSION THERAPY AND TREATMENT SYSTEM

(71) Applicant: Nextern, Inc., White Bear Lake, MN (US)

(72) Inventors: Ryan Douglas, Stillwater, MN (US); Casey Carlson, Saint Paul, MN (US)

(73) Assignee: Nextern Inc., White Bear Lake, MN (US)

(21) Appl. No.: 17/200,497

(22) Filed: Mar. 12, 2021

Related U.S. Patent Documents

Reissue of:
(64) Patent No.: 10,285,898
Issued: May 14, 2019
Appl. No.: 14/965,763
Filed: Dec. 10, 2015

U.S. Applications:
(60) Provisional application No. 62/090,092, filed on Dec. 10, 2014.

(51) Int. Cl.
*A61H 9/00* (2006.01)

(52) U.S. Cl.
CPC ... *A61H 9/0078* (2013.01); *A61H 2201/1635* (2013.01); *A61H 2201/164* (2013.01); *A61H 2201/5002* (2013.01); *A61H 2201/501* (2013.01); *A61H 2201/5015* (2013.01); *A61H 2201/5035* (2013.01); *A61H 2201/5043* (2013.01); *A61H 2201/5048* (2013.01); *A61H 2201/5071* (2013.01); *A61H 2201/5082* (2013.01); *A61H 2201/5097* (2013.01); *A61H 2230/065* (2013.01); *A61H 2230/207* (2013.01);

(Continued)

(58) Field of Classification Search
None
See application file for complete search history.

(56) References Cited

U.S. PATENT DOCUMENTS 6,368,357 B1 4/2002 Schon et al.
2008/0086064 A1 4/2008 Rembrand et al.
(Continued)

OTHER PUBLICATIONS

Tactile Systems Technology Inc., ACTitouch Adaptive Compression Therapy, 2013, Tactile Systems Technology Inc., Minneapolis, Minnesota, USA.

*Primary Examiner* — Robert L Nasser
(74) *Attorney, Agent, or Firm* — Craige Thompson; Thompson Patent Law; Timothy D. Snowden

(57) ABSTRACT

Apparatus and methods relate to a pneumatic compression therapy device configured to suggest content to the patient based on a determined disease state, the content pertaining to suggested changes in lifestyle based on a standard of care. In an illustrative embodiment, the suggested changes may include modifications to treatment location, treatment time, diet, eating habits, or sleeping schedule. Various examples may further sample the patient's health and automatically adjust a treatment parameter within a predetermined parameter range based on a history of measured parameters, such as limb volume, for example. In coordination with the therapeutic treatment, the therapy device may deliver suggested content to guide the patient to make more healthful lifestyle choices to reduce recovery time and improve patient health outcomes.

17 Claims, 12 Drawing Sheets

(52) U.S. Cl.
CPC .... *A61H 2230/25* (2013.01); *A61H 2230/505* (2013.01)

(56) References Cited

U.S. PATENT DOCUMENTS

| | | | | |
|---|---|---|---|---|
| 2011/0004110 | A1* | 1/2011 | Shusterman | G06F 19/00 600/509 |
| 2013/0234826 | A1* | 9/2013 | Sekiguchi | H04N 21/42201 340/5.53 |
| 2014/0006786 | A1 | 1/2014 | Campagna et al. | |
| 2014/0051906 | A1* | 2/2014 | Chen | A61N 1/3606 600/12 |
| 2014/0276257 | A1* | 9/2014 | Santa Maria | A61H 9/005 601/18 |
| 2014/0350349 | A1* | 11/2014 | Geurts | A61B 5/0022 600/300 |
| 2015/0105706 | A1 | 4/2015 | Polak | |
| 2016/0000640 | A1* | 1/2016 | Lai | A61H 9/0078 601/149 |
| 2016/0350846 | A1* | 12/2016 | Dintenfass | G06Q 40/00 |
| 2017/0027807 | A1 | 2/2017 | Waldridge | |

* cited by examiner

RESPONSIVE WHOLE PATIENT CARE COMPRESSION THERAPY AND TREATMENT SYSTEM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application claims the benefit of U.S. Provisional Application Ser. No. 62/090,092, titled "Dynamic Active-Compression-Therapy and Treatment System," filed by Ryan Douglas on Dec. 10, 2014. This application incorporates the entirety of the foregoing document herein by reference.

TECHNICAL FIELD

Various embodiments relate generally to pneumatic compression therapy devices.

BACKGROUND

Compression therapy and/or massage therapy is used in treating various diseases and injuries. Compression therapy may be a non-invasive mechanical method used for a variety of therapies and treatments. Compression therapy may be used to aid in the healing of wounds. Injuries that require portions of the body to be stabilized during recovery may use compression therapy to aid in such stabilization. Compression therapy may be used in the treatment of venous leg ulcers. Various forms of compression therapy may be used to treat different types of Edema, including lymphedema. Lymphedema is a chronic form of Edema that results from inadequate functioning of the lymphatic system, leading to accumulation of lymph fluid. Compression therapy for treatment of Lymphedema may be adjusted according to a patient's disease state. Deep vein thrombosis may involve compression therapy in a treatment regime.

Compression therapy may be performed using active methods and/or passive methods. Passive methods may include the use of compression bandages and compression garments. Compression garments may be garments that have an elastic that provides compression to a location on the body. Tight-fitting leggings may be worn to provide compression of the legs, for example. Tight-fitting sleeves may be worn to provide compression of an arm, for example. Active methods may include the use of pneumatic pumps and inflatable chambers configured to provide pressure to parts of the human body.

SUMMARY

Apparatus and methods relate to a responsive and dynamic pneumatic compression therapy device configured to suggest content to the patient based on a determined disease state, the content pertaining to suggested changes in lifestyle based on a standard of care. In an illustrative embodiment, that suggested changes may include modifications to treatment location, treatment time, diet, eating habits, or sleeping schedule. Various examples may further sample the patient's health and automatically adjust a treatment parameter within a predetermined parameter range based on a history of measured parameters, such as limb volume, for example. In coordination with the therapeutic treatment, the therapy device may deliver suggested content to guide the patient to make more healthful lifestyle choices to reduce recovery time and improve patient health outcomes.

Apparatus and associated methods relate to a compression therapy system that automatically adjusts a treatment parameter within a predetermined parameter range based on a history of measured limb volume. In an illustrative embodiment, ambulatory integration of a pneumatic engine may record a history of measurements of the time to inflate one or more pneumatic chambers under controlled conditions. The time to inflate the one or more pneumatic chambers may be indicative of a limb volume. A historical record indicating increasing time to inflate the one or more pneumatic chambers may indicate a reduced limb volume. In some embodiments, the compression therapy system may advantageously reduce a scheduled therapy time in response to an increasing time-to-inflate measurement.

Various embodiments may achieve one or more advantages. For example, some embodiments may rapidly improve a patient's health outcomes for a specific disease state by combining sensing and treatment of emotional human factors in coordination with corporal compression therapy for that disease state. Some examples may observe and detect likely changes in emotional state for patients who may feel isolated and alone and emotionally burdened by the challenges and setbacks that may occur for chronic conditions, such as lymphedema. Compliance with treatment regimens may be improved and yield substantially improved patient outcomes and reduced recovery time, and may reduce degradation to even more debilitating disease states (e.g., lymphostatic elephantiasis). By serving as a treatment hub for a specific disease state, and by providing lifestyle information to improve patient outcomes around the specific disease state, a therapy system may serve as a whole patient support system, capable of implementing and improving compliance with physician-prescribed therapeutic regimes, combined with healthy lifestyle choices. By monitoring the patient's current disease state and emotional states, the hub may suggest timely and appropriate encouragement, guidance, and healthy lifestyle information. Advantageously, the home based system can readily monitor patient compliance and certain observable lifestyle behaviors to understand how to provide encouragement and corrective action steps early when a variance occurs. In the event a trend changes, the system may reduce the time to report a user's health to a third party, such as a responsible relative, health care provider, or physician. In some embodiments, a user's use of a therapy device may be automatically reported to a physician. Such automatic reporting may facilitate a physician in prescribing a therapy regime. In some embodiments, automatic reporting to and from a hospital may help coordinate patient care. For example, a patient who requires daily compression therapy may be hospitalized for unrelated reasons. The hospital may be automatically informed by a dynamic treatment system of the patients prescribed therapy regime. Such coordination of health information may result in improved patient health.

In some embodiments, the time in which a user must perform therapy may be reduced by active monitoring of health metrics by a dynamic treatment system. For example, the dynamic treatment system may monitor a tissue density, and as the patient's tissue density improves, the dynamic treatment system may automatically reduce the therapy time. Such therapy time reductions may permit the user to participate in more non-therapy activities. Improved emotional health may result from such a time optimizing dynamic system.

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

To aid understanding, this document is organized as follows. First, a dynamic adjustment of compression therapy parameters is briefly introduced with reference to FIG. 1. Second, with reference to FIGS. 2-3, exemplary dynamic treatment systems will be described. Then exemplary methods of using treatment related parameters will be described, with reference to FIGS. 4-5. Next, with reference to FIG. 6, a plot of an exemplary health metric will be used to describe adaptive therapy treatment. Next, with reference to FIG. 7, exemplary apparatus and methods for autonomously treating a patient while adjusting treatment as a function of measured disease state is presented. Then, with reference to FIGS. 8-9, methods of measuring limb density for use in Lymphedema treatment are presented. Next, with reference to FIGS. 10-11, the structure of an exemplary bio-impedance measurement apparatus is presented. Finally, with reference to FIG. 12, a method of operating a compression therapy hub configured to deliver personalized compression therapy coupled with interactive delivery of emotional wellness content to treat lymphedema is disclosed.

Figure 1:
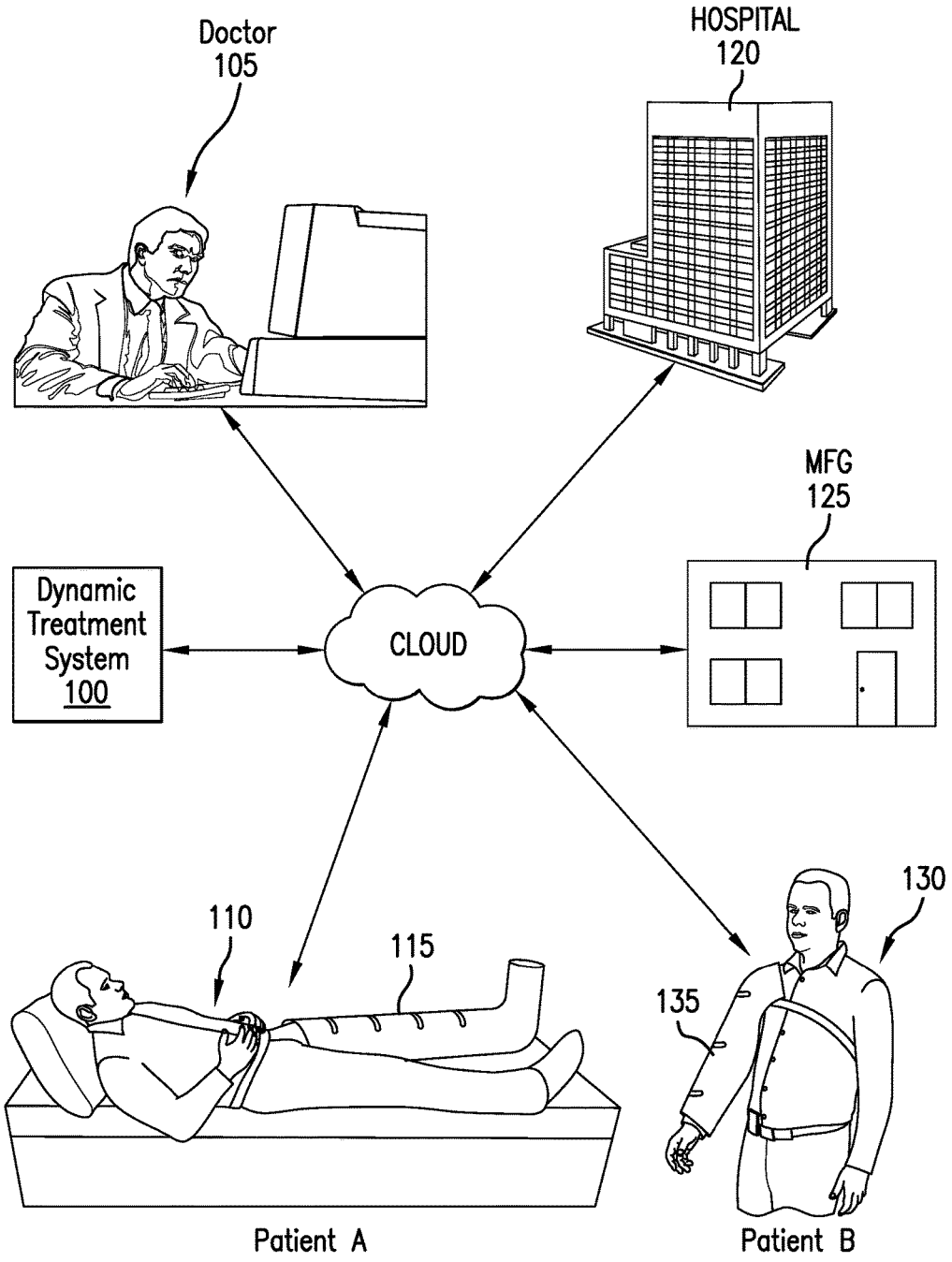
FIG. 1 depicts a schematic of a dynamic treatment system in network communication with interested parties.

FIG. 1 depicts a schematic of a dynamic treatment system in network communication with interested parties. In FIG. 1, an exemplary dynamic treatment system 100 is in network communication with a Doctor 105. The Doctor, may submit, for example, prescription for a patient to use an active compression therapy device. Patient A 110 may have an illness or injury in which an active compression therapy device 115 may be used to provide compression of Patient A's leg. The active compression therapy device 115 used by Patient A 110 may log data and send the logged data to the network for use by the dynamic treatment system 100. The dynamic treatment system 100 may be in network communication with a hospital 120 so as to coordinate Patient A's prescribed treatment with the hospital, should Patient A require hospitalization. The manufacture ("MFG") 125 of the compression therapy device 115 used by Patient A 110 may communicate information (e.g., testing data, upgrade software, etc.) to the dynamic treatment system 100. Various other patients, such as Patient B 130, may use an active compression therapy device 135 that is also sharing use data with the dynamic treatment system 100. The dynamic treatment system 100 may advantageously optimize a recommended therapy routine for Patient A 110 when using compression therapy device 115 based upon the data collected by one or more of the described sources.

Figure 2:
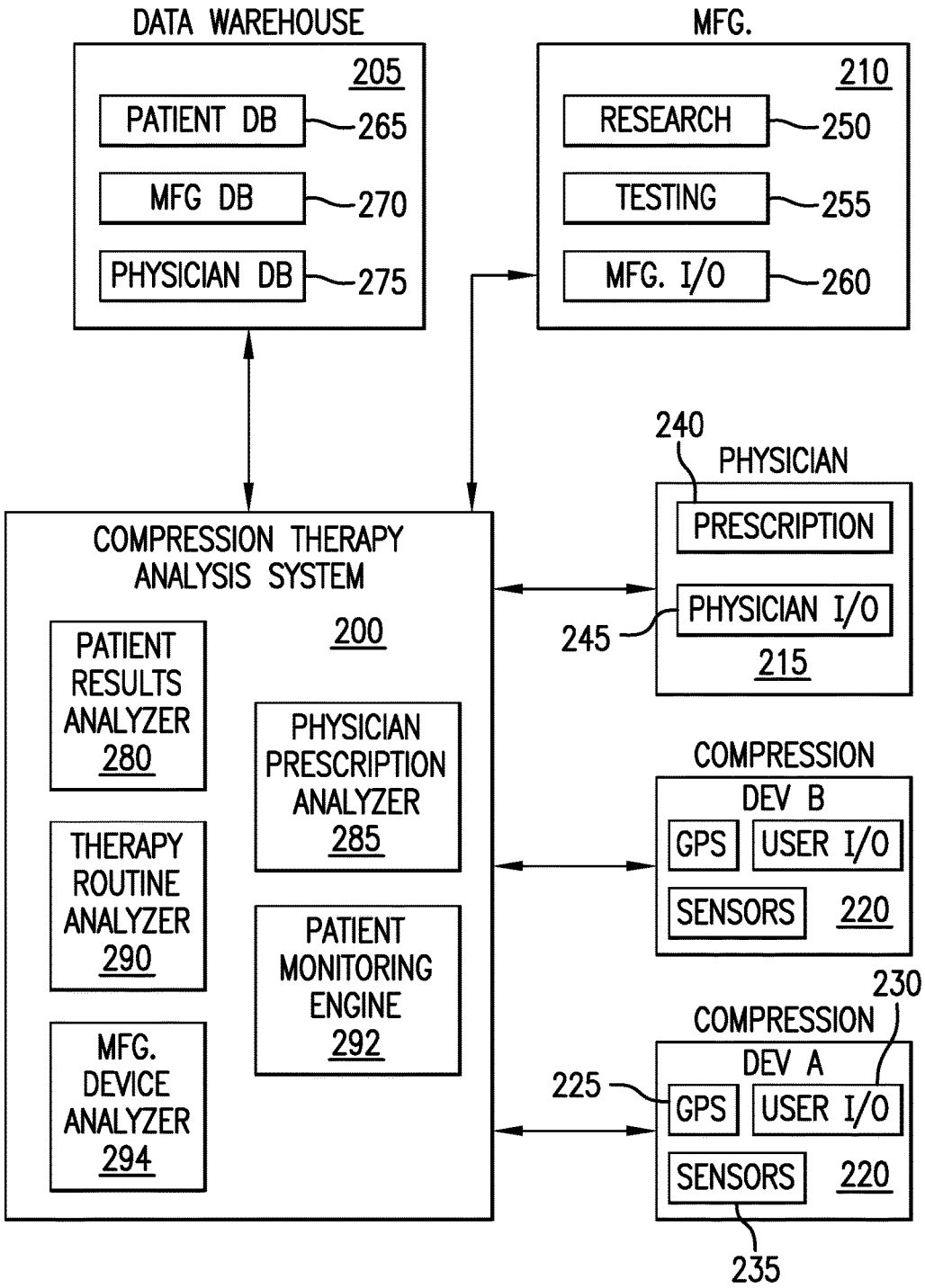
FIG. 2 depicts a block diagram of an exemplary compression therapy analysis system.

FIG. 2 depicts a block diagram of an exemplary compression therapy analysis system. In FIG. 2, a compression therapy analysis system 200 is in communication with a data warehouse 205, a device manufacturer 210, a physician 215 and two active compression therapy devices 220. Each of the active compression therapy devices 220 include a GPS position system 225, a user input/output interface 230 and one or more sensors 235. Each of the active compression therapy devices 220 may log data, when the compression therapy devices 220 are used. For example, when worn by a patient, a compression therapy device 220 may log the location of the user. Such location logging may be used to evaluate whether the patient was sedentary or moving during the compression therapy.

The user input/output interface 230 may provide bidirectional communication between the compression therapy device and the user. The sensors 235 may record parameters associated with the compression therapy device 220 and/or associated with the patient. For example, patient measurements, such as heart rate, blood oxygenation, blood flow, flow of other bodily fluids (e.g. Lymph), tissue health, tissue density, body temperature, etc. may be sensed by the sensors 235. Device related parameters, such as pump pressure, garment pressure, flow rate, inflation time, air temperature, etc. may be measure by the sensors 235.

The physician 215 may communicate prescription information 240 related to one of the patients 220 under the care of the physician 215. The physician 215 may receive and or send data to the compression therapy analysis system via a physician input/output interface 245. For example, a webpage, email and/or smartphone application may be used as a vehicle for communicating information between a physician 215 and a compression therapy analysis system 200.

The manufacturer 210 may share research data 250 and/or testing data 255 with a compression therapy analysis system 200. The manufacturer 210 may have an input/output interface for communicating with the compression therapy analysis system 200. For example, a computer program may facilitate communication between the compression therapy analysis system 200 and the manufacturer 210.

The data warehouse 205 may have a patient database 260, a manufacturer database 265 and/or a physician database 270. These databases may be accessible to the compression therapy *analysis* system 200 for use in determining an optimum therapy regime for a specific patient, for example.

The compression therapy analysis system 200 may include a patient results analyzer 280. The patient result analyzer 280 may determine a metric of success associated with a particular patient using a particular compression therapy device in a specific prescribed manner, for example. The patient result analyzer 280 may access the patient database 265 to obtain a history of use parameters logged therein, for example. The patient results analyzer may then determine a trend for a specific metric associated with successful therapy result. The trend of this specific metric is in a positive direction (e.g. improved health of patient), then the patient results analyzer may determine that the therapy is producing successful health results.

The compression therapy analysis system 200 may include a physician prescription analyzer 285. The physician prescription analyzer 285 may determine a metric of success associated with a specific physician, for example. The physician prescription analyzer 285 may compare a specific patient's prescription for using a particular compression therapy device with other patients who are similarly diagnosed. The physician prescription analyzer 285 may access the patients' data and/or the physician's data from the data warehouse 205, for example. The physician prescription analyzer may provide feedback to the physician in relation to one or more of the specific therapy regimes prescribed by that specific physician. For example, if the physician prescription analyzer 285 determines the patients with similar diagnoses benefits from a compression therapy regime that included longer therapy times than the therapy time prescribed by the physician, the physician prescription analyzer may communicate such a determination to the physician.

The compression therapy analysis system 200 may include a therapy routine analyzer 290. The therapy routine analyzer 290 may evaluate a specific prescription of a specific user. The therapy routine analyzer 290 may access the specific user's therapy history data from the data warehouse 205, for example. The therapy routine analyzer 290 may communicate with the user of a specific compression devices 220 regarding the positive and negative analysis results of the prescribed therapy routine. For example, if the therapy routine analyzer 290 is determining that the prescribed routine is producing positive health benefits, the therapy routine analyzer may send a message to the compression device 220 communicating such.

The compression therapy analysis system 200 may include a patient monitoring engine 292. The patient monitoring engine 292 may log a patient's use data associated with the compression therapy device 220. For example, if the patient skips a daily therapy session, from time to time, the patient monitoring engine 292 may send a reminder signal either to the device or directly to the patient via text message or email. In some embodiments, when the compression therapy device receives such a reminder signal, the compression therapy devices 220 may generate an email and/or an audible bell in response thereto. In some embodiments, a compression therapy device 220 may generate an audible speech message, reminding the user to perform a therapy session. In some embodiments, the compression therapy device 220 may begin a therapy session in response to receiving a reminder signal.

The compression therapy analysis system 200 may include a manufacturer device analyzer. The manufacturer device analyzer may compare the results that have accrued of many patients use of various manufacturer's compression therapy devices. The manufacturer device analyzer may generate a signal indicative of a success metric for a specific manufacturer's device. This signal indicative of a success metric may be communicated to the manufacturer of that specific device, for example.

The mobile device has a microprocessor [285] that executes the instructions associated with the APP[230]. The APP [230] may have instructions that correspond to a Graphical User Interface ("GUI"). The microprocessor [285] may send and/or receive signals to/from a user interface [290] that correspond to the GUI. For example, the APP [230] may have instructions that sound an alarm when it is time for a therapy routine to be executed. The processor [285] may send signals that present a graphical button on a display screen. When the button is pressed by the user, a signal is generated and received by the microprocessor [285], the signal indicative of the user's initiation of the scheduled therapy routine. The microprocessor [285] may send one or more signals corresponding to such an event to the compression garment controller in response to receiving the begin therapy signal. The signals sent by the microprocessor [285] may include a predetermined pressure for one or more pneumatic chambers for example.

Figure 3:
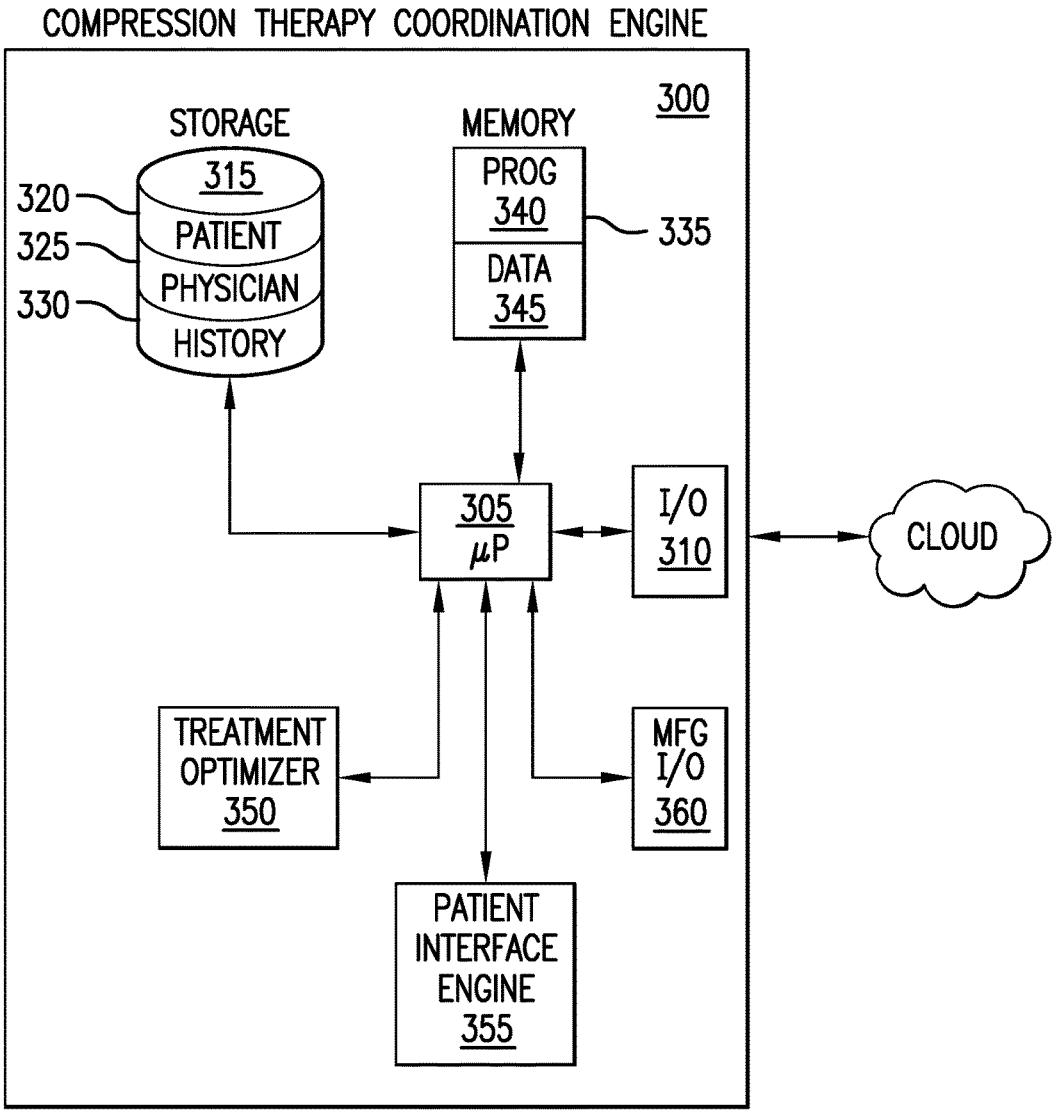
FIG. 3 depicts a block diagram of an exemplary compression therapy coordination engine.

FIG. 3 depicts a block diagram of an exemplary compression therapy coordination engine. In FIG. 3, a block diagram 300 of an exemplary compression therapy coordination engine includes a microprocessor 305 that is configured to communicate with a network via an input/output interface 310. The microprocessor 305 is in electrical communication with a data storage engine 315. The data storage engine 315 may include patient related data 320, physician related data 325 and/or therapy history data 330. The microprocessor 305 is in electrical communication with a memory bank 335. The depicted memory bank includes program memory 340 and data memory 345.

The microprocessor 305 is in electrical communication with a treatment optimizer 350. The treatment optimizer 350 may determine a success metric associated with a specific treatment that is prescribed for a specific patient. The treatment optimizer 350 may determine a success metric associated with a new treatment in which one or more of the treatment parameters is not equal to the prescribed treatment parameter. If, the success metric for the new treatment is better than the success metric for the prescribed treatment, the treatment optimizer 350 may compare the new treatment parameter to a predetermined allowable range for that treatment parameter. If the new treatment parameter is within the predetermined allowable range, the treatment optimizer 350 may determine that the new treatment parameter should be suggested for use by the patient.

The microprocessor 305 is in electrical communication with a patient interface engine 355. The patient interface engine 355 may include a user input and/or a display device, for examples. The patient interface engine 355 may include an audible signal generator, in some embodiments. The microprocessor 305 is in electrical communication with a manufacturer input/output interface 360. The manufacturer input/output interface 360 may be a TCP/IP interface, for example. Communication between a compression therapy coordination engine and a manufacturer may be performed over the internet, for example.

Figure 4:
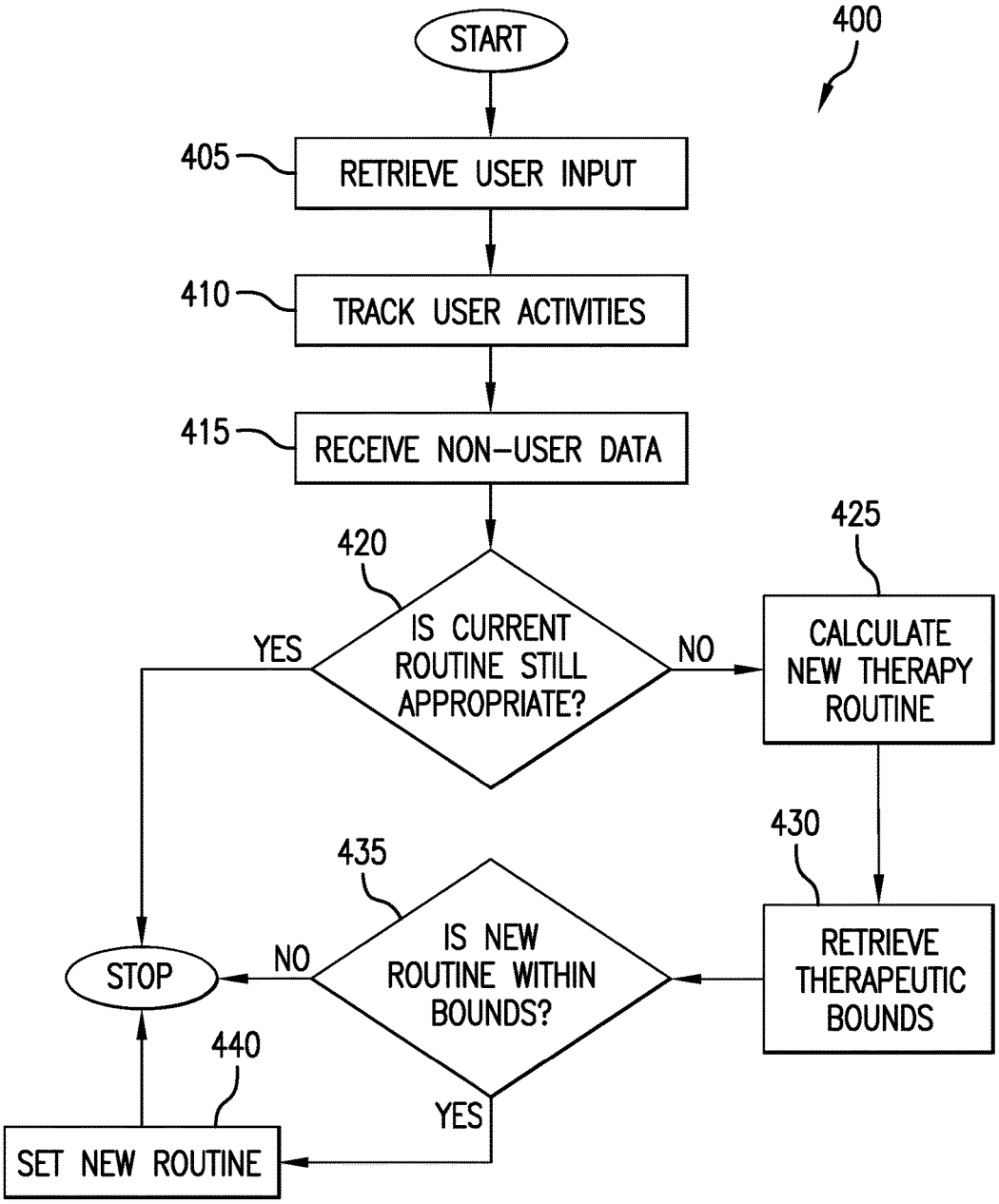
FIG. 4 depicts a flowchart of an exemplary method of dynamically modifying a treatment program within predetermined limits

FIG. 4 depicts a flowchart of an exemplary method of dynamically modifying a treatment program within predetermined limits. The method depicted in FIG. 4 is given from the perspective of the microprocessor 305 depicted in FIG. 3. The depicted method 400 begins with the microprocessor 305 retrieving 405 user input data from a specific user. Various types of user input data may be retrieved. For example, the microprocessor 305 may send a signal querying the user as to how well the user feels. The user may respond to the query via an input device, such as a touch sensitive screen, for example. The user may input nutritional information associated with a user's diet for example.

Then the microprocessor 305 tracks 410 various user activities. For example, the microprocessor may receive signals from the input/output interface, the signals associated with one or more user activities. Signals associated with movement of the user during therapy, for example, may be received by the microprocessor 305. A signal associated with the user's body temperature may be received by the microprocessor 305. A signal associated with the user's tissue density may be received by the microprocessor 305. A signal associated with the way a user uses a compression therapy device may be received by the microprocessor 305, for example. A signal associated with a heart rate of the user may be received by the microprocessor 305. Various signals associated with a specific compression therapy device may be generated by sensors on that compression therapy device. These device related signals too may be sent to the microprocessor 305. [004I] The method continues with the microprocessor 305 receiving 415 non-user data. For example, the microprocessor 305 may receive signals associated with environmental conditions (e.g., ambient temperature, barometric pressure, etc.). The microprocessor may receive signals associated with standards of care, for example. The manufacturer and/or a physician may send such a signal to a compression therapy coordination engine, for examples. The microprocessor 305 may receive a signal associated with a patient population database. The method continues with the microprocessor 305 determining 420 if a currently practiced therapy routine is still appropriate for a patient. If the currently practiced therapy routine is not still appropriate, the microprocessor 305 calculates 425 a new therapy routine. Then the microprocessor retrieves 430 therapeutic bounds for parameters of the new therapy routine. The microprocessor then determined 435 if parameters of the new therapy routine reside within the retrieved bounds for parameters. If the new parameters are within the retrieved bounds, then the microprocessor sends 440 a signal to the user suggesting the user use the new therapy routine. If, however, the new parameters are not within the retrieved bounds, then the method simply ends. And if back at step 420, the microprocessor 305 determined that the currently practiced therapy routine was still appropriate, the method ends.

Figure 5:
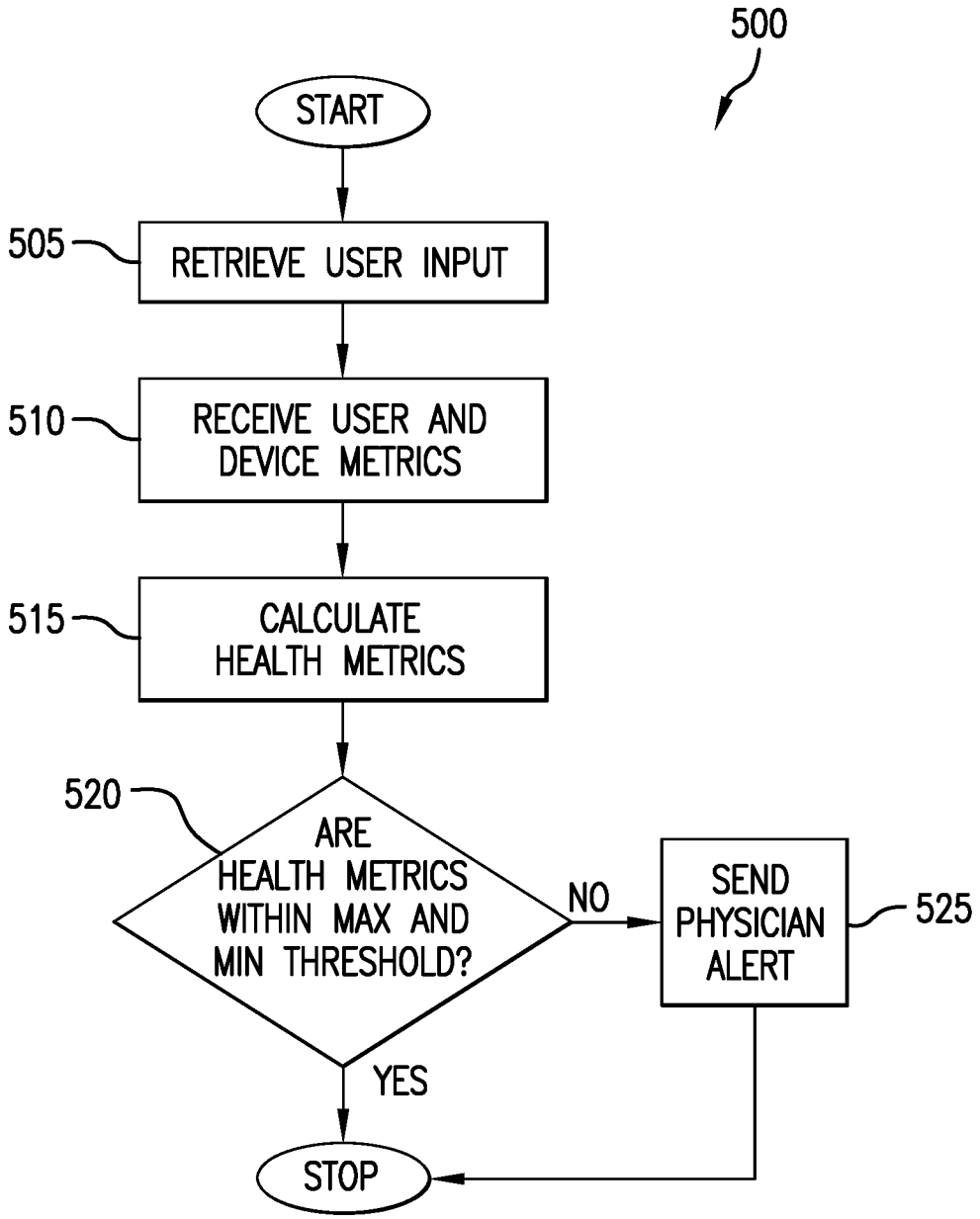
FIG. 5 depicts a flowchart of an exemplary method of automatically generating alerts to a physician.

FIG. 5 depicts a flowchart of an exemplary method of automatically generating alerts to a physician. The FIG. 5 method 500 is given from the perspective of the microprocessor 305 of FIG. 3. The method 500 begins with the microprocessor 305 retrieving 505 signals associated with user input. For example, the user may input data associated with the user's emotional state (e.g., happy, frustrated, afraid). The method then continues with the microprocessor 305 receiving 510 signals associated with the user's use of a compression therapy device. The received data may include signals associated with the user and/or signals associated with the device. For example, device signals may include signals indicative of pump pressure, pump flow, chamber pressure, garment pressure, manifold/plenum pressure, time stamp, chamber temperature, and/or chamber volume. For example, user signals may include signals indicative of a user's blood pressure, blood flow, flow of other bodily fluids (e.g., Lymph), heart rate, tissue health, tissue density, lymph measurement, and/or blood oxygenation.

The microprocessor 305 then may calculate 515 one or more user health metrics. For example, the microprocessor may calculate a metric associated with a user's emotional state, physical health, therapy practice and/or historical trends for a calculated parameter. For example, the microprocessor may calculate that the patient has abruptly changed the user's use of a compression therapy device, perhaps abandoning therapy altogether. The microprocessor then compares 520 one or more of the calculated metrics with a predetermined minimum threshold and a predetermined maximum threshold for each of the calculated metrics. If one or more of the calculated metrics exceeds the predetermined maximum threshold or is less than the predetermined minimum threshold, then the microprocessor may send a signal at 525 to a physician associated with the patient.

Various implementations may use exemplary home based devices as a monitoring station, in addition to use as a treatment device. In some embodiments, various methods for obtaining the state of the patient and the patient's response to treatment may be employed to develop and refine a personalized profile of the patient. In various embodiments, a personalized profile of a patient may be used to tailor a treatment program that treats the whole patient. In various implementations, methods for obtaining the state of the patient and the treatment may comprise sensing, monitoring, or polling. In some embodiments, the treatment program tailored as a function of a personalized profile of a patient targets both the specific aliment that requires compression therapy and the physiological, psychological and life style based issues (or personal choices) that accompany or potentially contribute to the disease state.

In some embodiments, a personalized profile of a patient may be determined as a function of data received as system inputs. In various implementations, system input data useful for determining a personalized profile of a patient may comprise sensor input data or subjective input data. In some implementations system input data useful for determining a personalized profile of a patient may include: voice monitoring (detecting fluctuations or spectral signature that may suggest deteriorations in physical wellbeing or mental states); motor skills testing (e.g., detecting changes in ability to respond and react to signals or commands) cognitive skills testing (e.g., detecting changes in ability to solve problems), basic patient vital signs (e.g., heart rate, respiratory rate, blood pressure, body temperature); micro fluidics (body fluid sample analyzed by chip on board); electronic signature; total computer use; emails received; times of day engaging with work related activities; movement, including phone GPS and health tracker style information designed to determine total amount of exercise and excursion; or, sleep monitoring. In various embodiments, subjective input data useful for determining a personalized profile of a patient may include: how the patient reports to feel; psychological profiles; or, AI-based interactions designed to establish and track mental, emotional and physical state. Exemplary devices may query a patient about the patient's well-being on a regular schedule. In some implementations, a user may provide input representative of how often they use the system, the general nutrition level of the user, or the general subjective well-being of the patient. In further embodiments, input data may comprise tracked user activities, and the tracked data archived and mined to determine beneficial adaptations in treatment protocols. In various implementations, tracked user data may include: how a patient uses the system, the general activity level and exercise routine of the patient; hydration level; limb volume; and tissue density. In other embodiments, input data may comprise data received from the cloud and representative of environmental conditions, standards of care, and patient population trends. In various implementations, a personalized lymphatic system wellness profile may be determined as a function of input data. In some embodiments, questions about a patient's well-being may be asked more or less frequently, and the interrogative schedule may be determined as a function of the patient's past answers or the advice of a physician. In further embodiments, the schedule or content of questions asked of a patient may be adapted by an AI (artificial intelligence) algorithm, to detect the severity of a patient's mental or emotional condition, whether the mental or emotional condition has changed significantly, and whether the change in mental or emotional condition is a result of, or cause of, changes in disease state. Exemplary devices may determine treatment can be beneficially adapted to improve the patient's treatment outcome or patient well-being. When treatment can be beneficially adapted, exemplary devices may automatically adjust treatment parameters customized to the patient's personalized profile. In some embodiments, treatment parameters customized to the patient's personalized profile may include lifestyle suggestions.

In various implementations, a treatment program tailored to a patient may be dynamically and automatically adapted to the patient's disease state as treatment progresses. Exemplary devices may tailor a treatment program to treat a patient's disease. In some implementations, a treatment program may be tailored as a function of system outputs adapted to treat a patient's disease. In various embodiments, system outputs designed to provide a tailored treatment program may include reports or responses determined as a function of historical or archived data, including data representative of system use as a function of patient well-being. In further embodiments, system outputs may comprise reports or alerts representative of how user behaviors are influencing disease control and treatment. In some embodiments, system outputs may alert a user to abrupt changes in treatment. In various implementations, system outputs may alert physicians to changes in patient health status or patient emotional well-being.

In other implementations, system outputs used to provide a tailored treatment program may include reports or responses based on prescriptive data, including data representative of lifestyle and treatment options based on input data. In various implementations, system outputs comprising prescriptive information may propose an effective treatment protocol determined as a function of mined empirical or historical data. In some embodiments, system outputs comprising prescriptive information may offer additional lifestyle activities to enhance treatment, including education, exercise, or nutrition. In various embodiments, system outputs comprising prescriptive information may offer direction for reversing areas of concern, for example, suggesting an activity or enhancement which may have been effective in the past. In some implementations, system outputs used to provide a tailored treatment program may include automated reports or responses, including automatic adjustment of treatment protocols based on individual need. In various embodiments, system outputs comprising automation may dynamically adjust treatments to meet a patient's specific needs. In some implementations, system outputs comprising automation may adjust treatment protocols for compliance with a prescribed treatment regimen. In various embodiments, system outputs comprising automation may adjust treatment protocols to improve quality of life. In some embodiments, system outputs comprising automation may capture patient population data and system usage patterns to improve products and standards of care.

In further embodiments, a treatment program may employ system outputs designed to focus the patient's efforts on wellness specific to the individual's disease state, personal well-being, and desired health outcomes. Various embodiments may be tailored to ensuring the patient can manage and thrive with a chronic condition, measuring success in compliance to treatment, and in the healthy reduction in home based treatment system use, in favor of healthy lifestyle based choices and activities.

Some embodiments may adaptively select a therapy session, adaptively adjust a treatment protocol, or determine suggestions for a patient, as a function of a patient's disease state. In some implementations, a patient's disease state may comprise the patient's tissue condition. Various implementations may adaptively select a therapy session, adaptively adjust a treatment protocol, or determine suggestions for a patient, as a function of a patient's disease state, using artificial-intelligence techniques for adaptive treatment adjustment such as those disclosed with reference to FIGS. 2 and 3 of U.S. application Ser. No. 14/936,462, titled "Dynamically Controlled Treatment Protocols in Close Loop Autonomous Treatment Systems," filed by Ryan Douglas, on Nov. 9, 2015, the entire contents of which are herein incorporated by reference.

Figure 6:
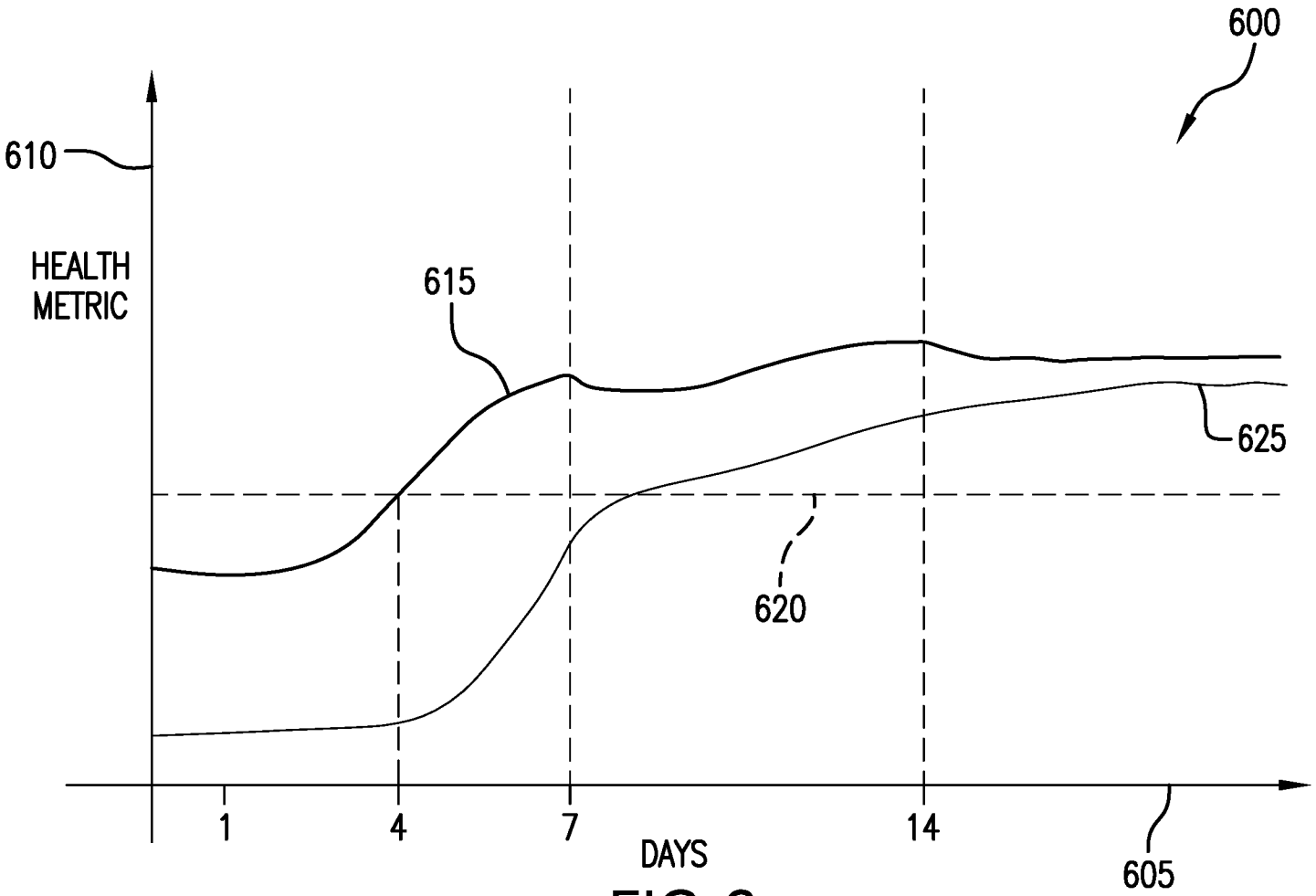
FIG. 6 depicts an exemplary graph plotting a health metric vs. days of treatment.

FIG. 6 depicts an exemplary graph of a health metric plotted versus time. In the FIG. 6 depiction the exemplary graph 600 includes a horizontal axis 605 that indicates the elapsed time in days. The graph 600 has a vertical axis 610 that indicates a particular health metric, with higher values associated with better health, and lower values associated with poorer health. A patient's objective health metric 615 is plotted on this graph 600. A patient's subjective health metric 625 is also plotted on this graph. Also plotted on this graph 600 is a minimum threshold 620 associated with of acceptable value of the objective health metric. Below the minimum threshold 620, the patient's objective health metric may be considered pathological, and above the minimum threshold 620, the patient's objective health metric may be considered normal.

The patient may begin using an active compression therapy device at day 1. The objective health metric 615 improves monotonically until day 7. Improvement of the subjective health metric 625 may lead or lag improvement of the objective health metric 615. The objective health metric 615 crosses the minimum threshold on day 4. On day 7, a dynamic therapy calculator suggests a decrease in the time that the active compression device need be used. The user accepts the recommended therapy time and continues therapy, but using the reduced time. The objective health metric 615 is maintained above the minimum threshold 620, even with the reduced therapy time through day 14. On day 14, the dynamic therapy calculator suggests another decrease in the time that the active compression therapy device need be used. And again the user accepts the recommended therapy time and continues therapy, but using the further reduced timer. And again the objective health metric 615 is maintained above the minimum threshold 620.

In some embodiments, a display screen may display health information to a user. Objective data may be presented to the user in chart, table and/or other format. For example, the sensor collected data may be presented to the user. The data may be displayed during a therapy session, for example. In some embodiments, the user may control the display of information. For example, the user may select a display of the last three weeks of a parameter. The system may then present a chart to the display screen showing the selected information. In some embodiments, the subjective information may be displayed for the user. For example, a graph may be presented displaying measured health and/or perceived health versus days.

Figure 7:
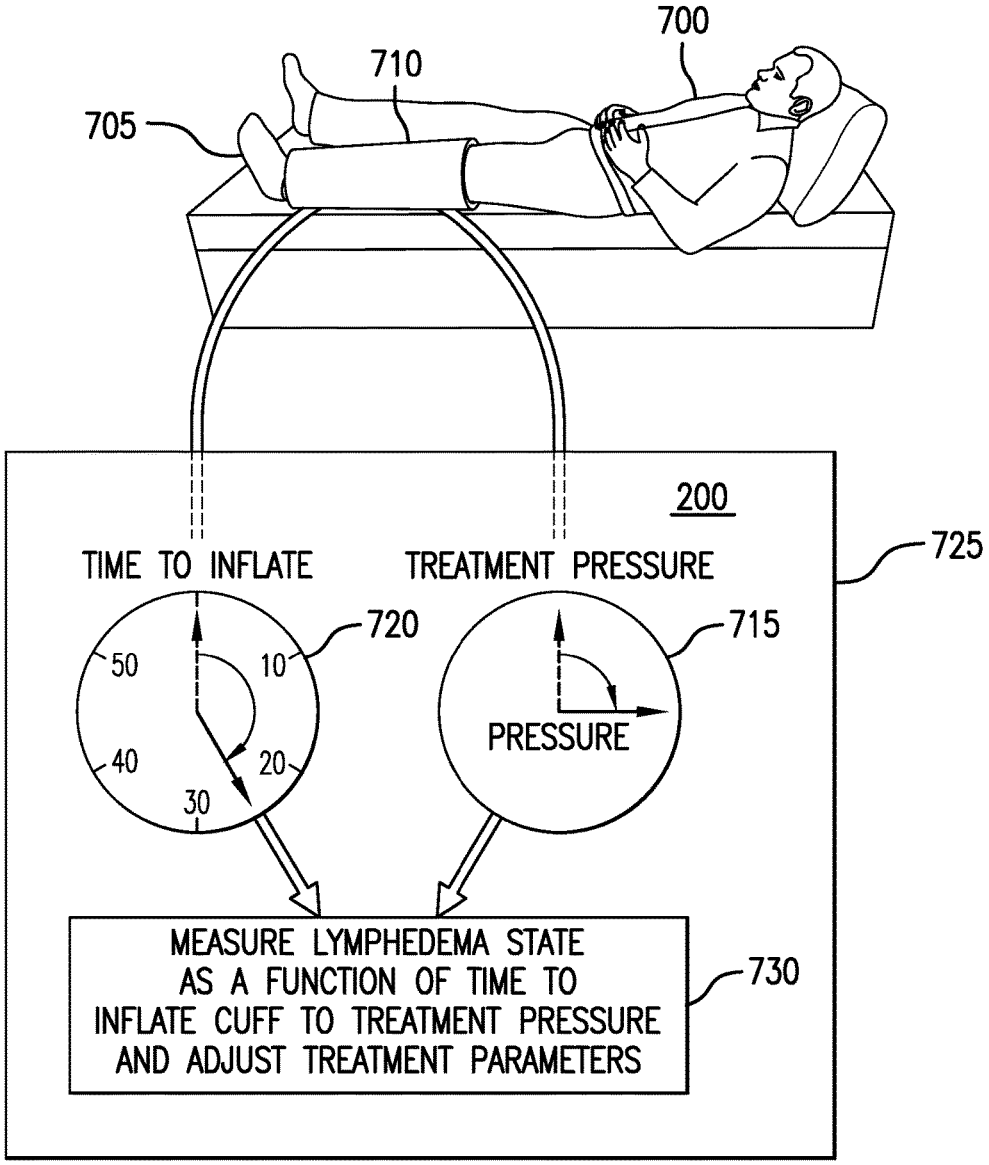
FIG. 7 depicts an exemplary compression therapy device adjusting Lymphedema treatment parameters according to limb density, determined as a function of the time required to inflate the compression cuff to the treatment pressure.

FIG. 7 depicts an exemplary compression therapy device adjusting Lymphedema treatment parameters according to limb density, determined as a function of the time required to inflate the compression cuff to the treatment pressure. In some embodiments, a patient's disease state may be measured and treatment parameters customized to better cater to a patient's needs. Exemplary devices may measure the response of a patient's body to treatment, use the measured response to estimate the patient's disease state, and adjust treatment as a function of the patient's estimated disease state. In an illustrative example, treatment of a limb may be adjusted as a function of measured lymph concentration. Various implementations may measure lymph concentration using a variety of techniques, including as a function of inflation time for a pressure treatment cuff to reach a predetermined pressure. With reference to FIG. 7, a patient 700 is using an exemplary compression [therapy device 200] *therapy-device 220* to treat Lymphedema in a limb 705. The patient is wearing an exemplary inflatable pressure treatment cuff 710 operably coupled to the compression therapy device for inflation of the cuff and measurement of cuff pressure. In some embodiments, the device may implement a Lymphedema treatment protocol by inflating the cuff, and measuring cuff pressure 715 as a function of time 720. Various implementations may measure the time required to inflate the cuff to a predetermined treatment pressure 725. In some embodiments, the state of the patient's Lymphedema may be estimated 730 as a function of limb density, which may be estimated from the time required to inflate a pressure treatment cuff to a predetermined treatment pressure, and as a function of: the measured size of the limb, the known density of lymph fluids, and the particular size of the cuff. Some embodiments may adjust treatment protocols and treatment parameters in response to changes in the measured disease state. In further embodiments, adjustment of treatment protocols and treatment parameters may be determined as a function of measured disease state and standards of care including expected progress of the disease state over time. In further embodiments, lymph concentration may be measured as a function of the propagation of an electrical signal applied to affected tissue. In various implementations, wearable and non-wearable devices may dynamically adjust compression treatment as a function of limb density. Exemplary devices may include therapeutic compression cuffs for various body parts, including legs, thigh, wrist, arm, hand, neck, torso, calf, foot, abdomen, midsection, or foot. Examples of wearable devices that may be used to provide compression therapy, including ambulatory operation, are described with reference, for example, to at least FIGS. 1-4 of U.S. patent application Ser. No. 14/965,668, titled "Wearable Active-Compression Therapy and Treatment," filed by Douglas, et al., on Dec. 10, 2015.

Lymphedema is a chronic debilitating condition that results from inadequate functioning of the lymphatic system that leads to accumulation of extracellular lymph fluid. This condition occurs in approximately 25% of women post treatment for breast cancer. As the condition worsens, cellular infiltration of the fluid occurs ("stagnation") including development of fibrosis and accumulation of lipid material which may also present as a specific condition known as lipedema. In addition, obesity is a common co-mobility with lymphedema. Methods to determine the volume of lymphedema present in the body include arm/leg circumference measurement, water displacement, x-ray absorptiometry, self-assessments, and bio-impedance.

Figure 8B:
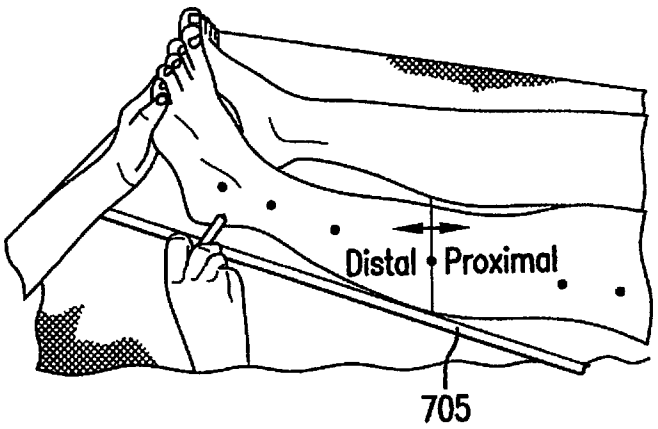
FIGS. 8A and 8B depict measurement of a patient's arm and leg circumference for limb density calculation in support of Lymphedema therapy.
Figure 8A:
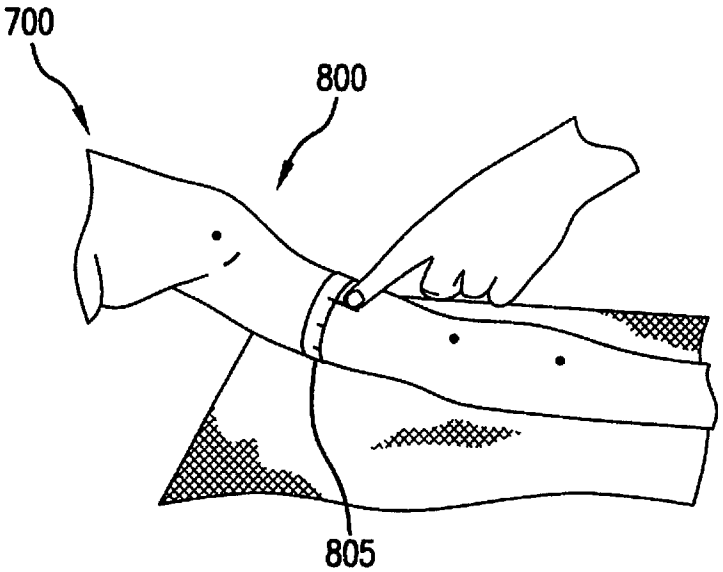

FIGS. 8A and 8B depict measurement of a patient's arm and leg circumference for 30 limb density calculation in support of Lymphedema therapy. With reference to FIGS. 8A and 8B, circumference measurements of a patient's arm 800 and leg are obtained using a tape measure 805. The patient is normally seated with their arms/legs vertically along the body. Points following anatomical landmarks are typically picked to measure the circumference and to ensure uniformity for repeated measurements. Measurements are then compared to the previous data obtained and a delta in data would signify the effectiveness of the treatment. Exemplary devices may automatically obtain circumference measurements from sensors embedded in compression treatment cuffs.

Figure 9B:
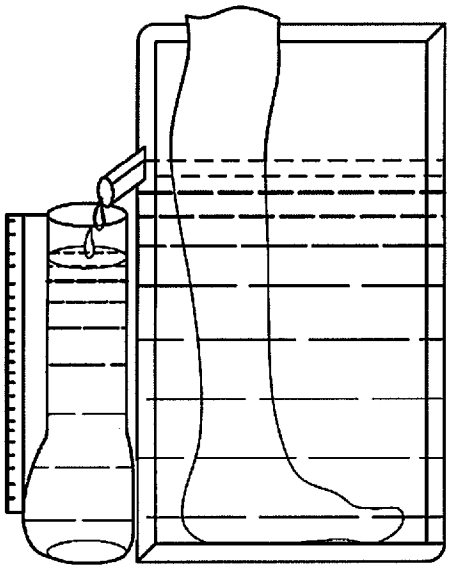
FIGS. 9A and 9B depict measurement of fluid displacement of a patient's arm and leg for limb density calculation in support of Lymphedema therapy.
Figure 9A:
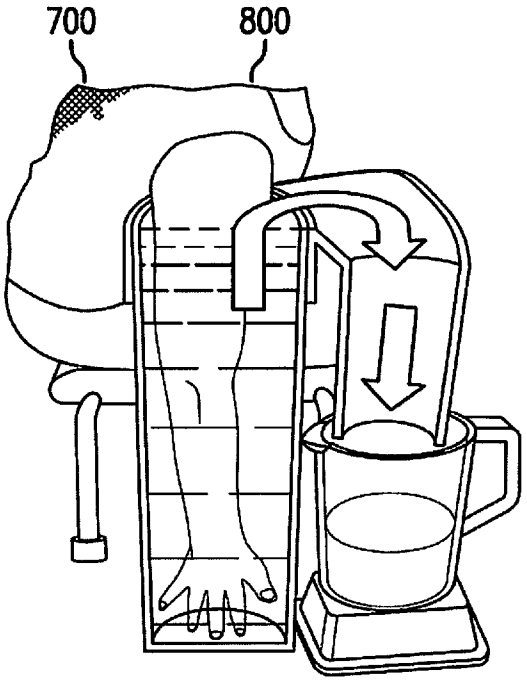

FIGS. 9A and 9B depict measurement of fluid displacement of a patient's arm and leg for limb density calculation in support of Lymphedema therapy. With reference to FIGS. 9A and 9B, volumeters are used for the arm and legs to measure the presence of lymphedema in the system. Patients slowly immerse either their legs or arms in the 10 volumeter. The displaced water is then collected in a separate container which is weighed. Water displacements are compared with the previous data and a delta in data would signify the effectiveness of the treatment.

Figure 10:
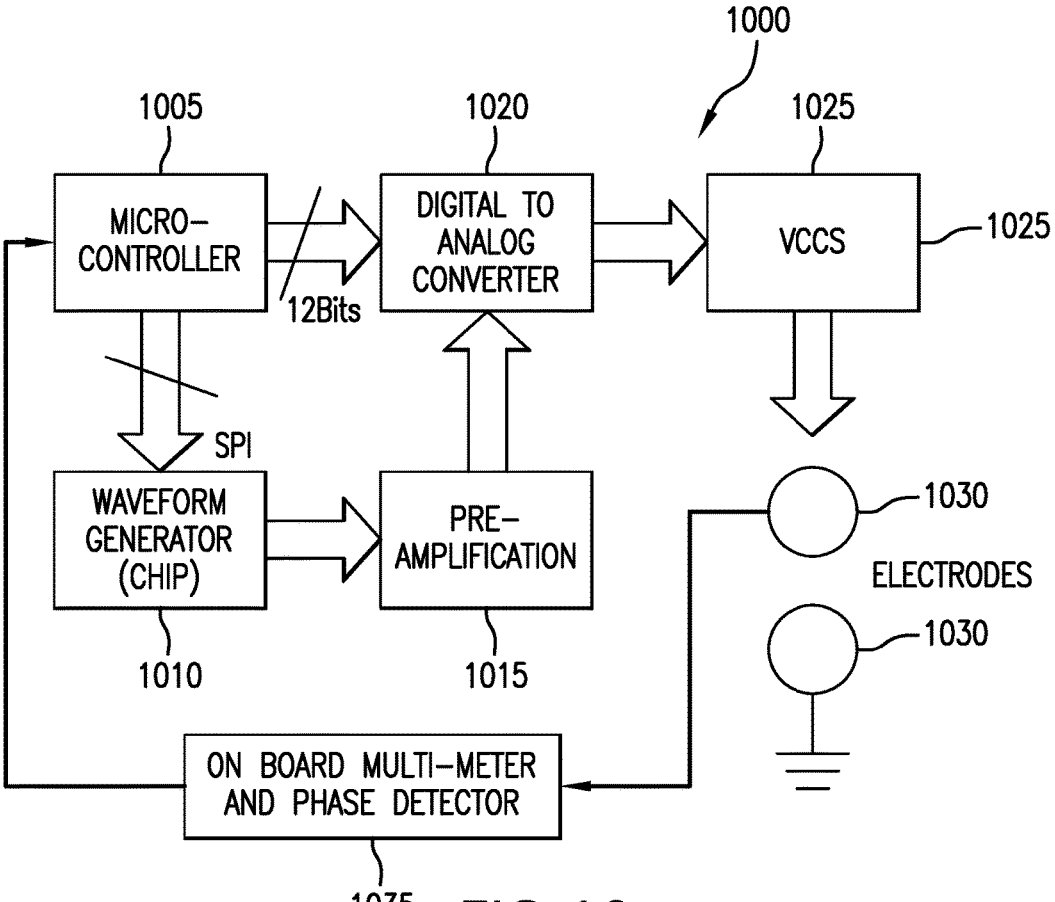
FIG. 10 depicts the block diagram of an exemplary bio-impedance measurement system used for Lymphedema therapy.

FIG. 10 depicts the block diagram of an exemplary bio-impedance measurement system used for Lymphedema therapy. With reference to FIG. 10, an exemplary bio-impedance measurement system 1000 may include a microcontroller 1005, waveform generator 1010, signal preamplifier 1015, Digital-to-Analog converter 1020, Voltage Controlled Current Source 1025, electrodes 1030, and a signal measurement sub-system 1035 which may include an on-board multimeter and phase detector. In some embodiments, the microcontroller executes program instructions directing the waveform generator to create signals useful for limb density measurement. A generated signal is pre-amplified to a level appropriate for the Digital-to-analog converter. The signal drives a Voltage Controlled Current Source operable coupled to the electrodes. In various embodiments, the electrodes may be in contact with the patient's skin in an area of the patient's body afflicted with Lymphedema. In various implementations the electrodes deliver current to the skin according to the generated signal waveform, providing an electrical stimulus to the patient's skin. The signal response from the generated electrical stimulus is a function of the limb density and the Lymphedema disease state, including the fluid density, of the affected limb. In various implementations, the microcontroller executes program instructions directing the on-board multimeter and phase detector to measure the signal response from the generated electrical stimulus. In other embodiments, the microcontroller executes program instructions that calculate the patient's limb density and the Lymphedema disease state as a function of the measured signal response from the generated electrical stimulus.

Figure 11:
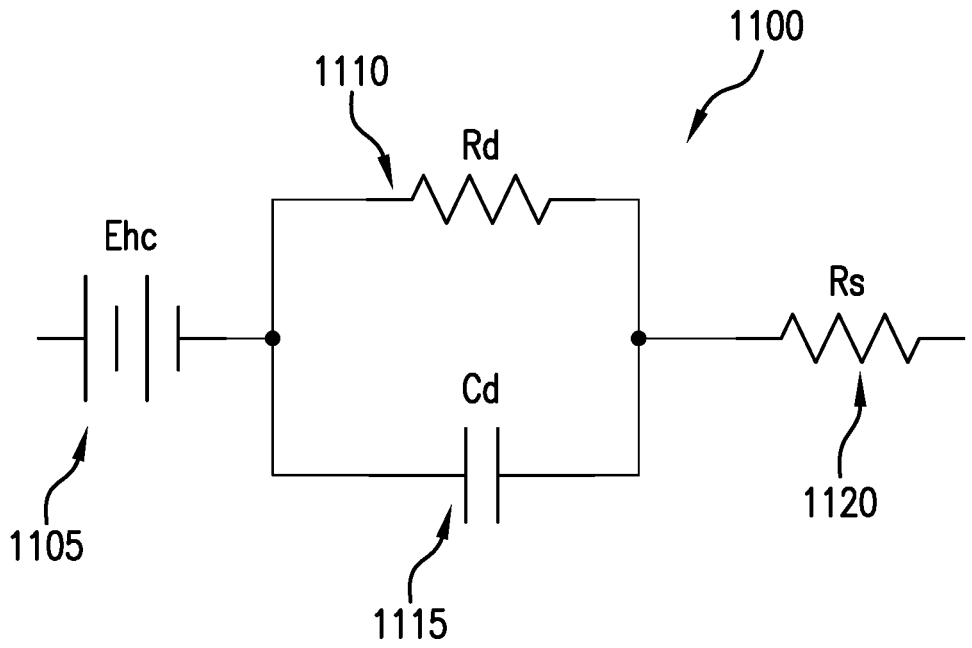
FIG. 11 depicts the electrode equivalent circuit of an exemplary measurement sensor used for Lymphedema therapy.

FIG. 11 depicts the electrode equivalent circuit of an exemplary measurement sensor used for Lymphedema therapy. With reference to FIG. 11, an electrode equivalent circuit 1100 of an exemplary measurement sensor used for Lymphedema therapy includes half-cell potential $E_{hc}$ 1105, impedance associated with the electrode-skin interface $R_d$ 1110, polarization at the electrode-skin interface $C_d$ 1115, and series resistance of the electrode material $R_s$ 1120. The electrode-skin impedance is dominated by the series combination of Rs and $R_d$ at low frequencies, however this impedance decreases at higher frequencies due to the capacitor's effect.

The electrode-skin impedance is an important issue when designing the analog front end due to the high impedance involved. The IEC 60601 is a series of technical standards for the patient safety and effectiveness of medical electrical equipment, published by the International Electrotechnical Commission. This standard specifies the limits of patient leakage currents and patient auxiliary currents under normal conditions and single fault conditions. In some embodiments, these current limits are important parameters in the circuit design. In other implementations, the maximum DC current allowed to be sourced in the body in normal conditions has to be less than or equal to 10 uA and the maximum DC current under single fault condition in the worst scenario is 50 uA. In further embodiments, the maximum AC current allowed to be sourced in the body in normal conditions depends on the frequency, and if the excitation frequency is less than or equal to 1 kHz, the maximum allowed current is 10 uARMS.

Figure 12:
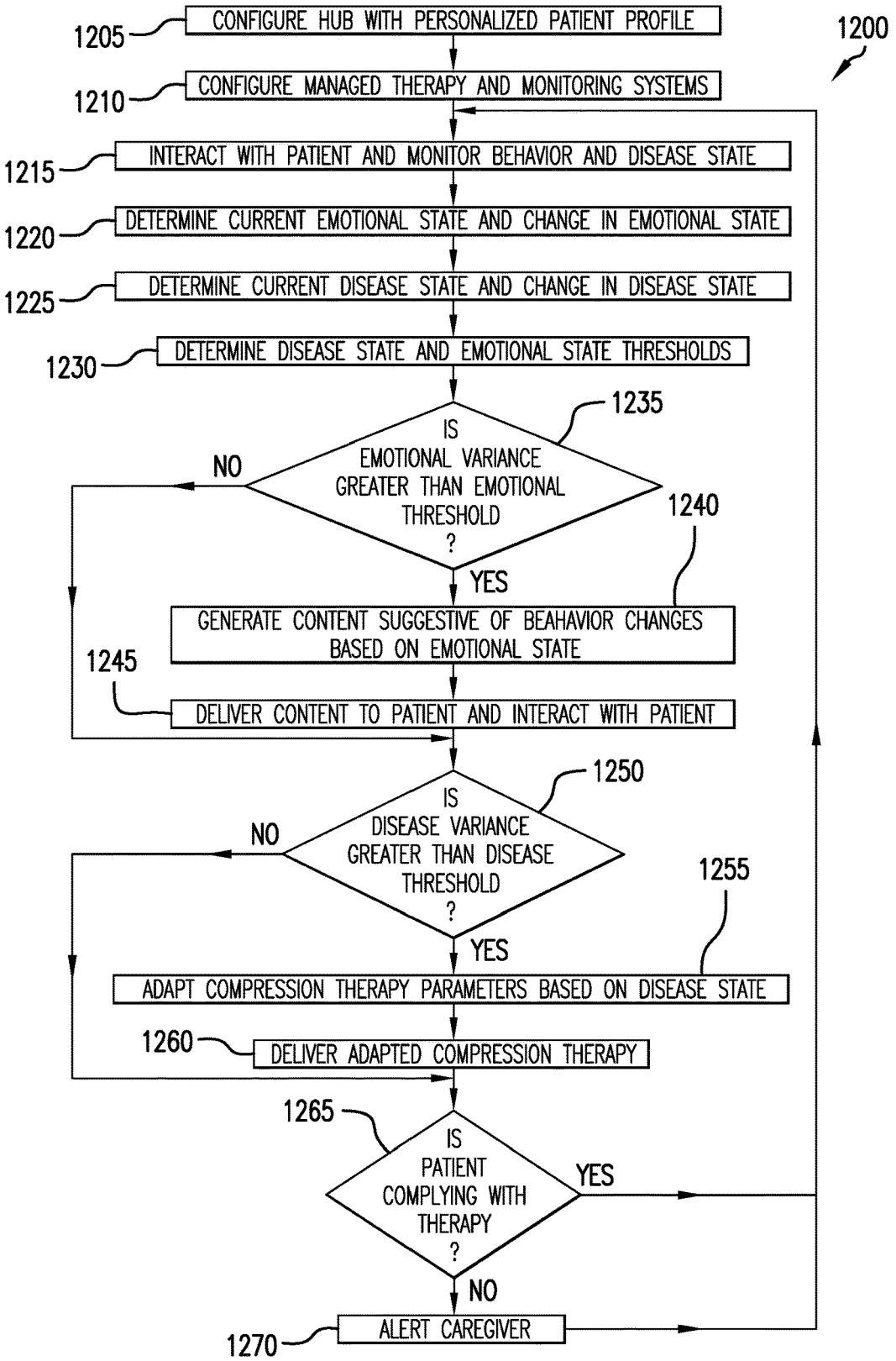
FIG. 12 depicts an exemplary method of operating a compression therapy controller module (CTCM) as a system hub configured to deliver personalized compression therapy coupled with interactive delivery of emotional wellness content to treat lymphedema.

FIG. 12 depicts an exemplary method of operating a compression therapy controller module (CTCM) as a system hub configured to deliver personalized compression therapy coupled with interactive delivery of emotional wellness content to treat lymphedema. In the depicted figure, an exemplary method 1200 is disclosed for operating a compression therapy controller module (CTCM) to serve as a lymphedema treatment hub by selectively providing therapy in a plurality of modes.

In FIG. 12, in a first stage, at step 1205, the CTCM is configured with a personalized patient profile. In a second stage, at step 1210, managed therapy and monitoring systems and devices are configured based on the personalized patient profile. Various embodiments may actively manage therapy and monitoring devices comprising inflatable cuffs, inflatable garments, pressure sensors, temperature sensors. In some embodiments, actively managed therapy and monitoring devices may include their own embedded controller. In further embodiments, exemplary devices may manage and interact with a plurality of therapy and monitoring devices via secure network communication. In a third stage, at step 1215, the CTCM interacts with the patient and samples monitored data representative of the patient's therapy and disease state. In some embodiments, interaction with the patient may include inquiring how the patient feels, and recording the patient's response. In other embodiments, voice processing technology may be used to assess a patient's mood as a function of the patient's speech pattern. In some embodiments, monitored patient activity levels, such as the rate of answering emails, or the frequency of going outdoors, may be used to determine a patient's mood as a function of changes in activity level over time. In various implementations, monitored data representative of the patient's therapy may include sensor data measured during therapy, such as the time to inflate a cuff, or calculated parameters, such as the fluid density in a limb as a function of measured physical response.

In a fourth stage, at step 1220, the patient's current emotional state is determined. Some embodiments may determine the change in the patient's emotional state as a function of historical emotional state data. In a fifth stage, at step 1225, the patient's current disease state is determined. Various implementations may determine the change in the patient's disease state as a function of historical disease state data. In a sixth stage, at step 1230, disease state and emotional state thresholds are determined. Various embodiments may determine an operational mode as a function of a patient's disease and emotional state thresholds. Exemplary devices may select an operating mode for delivering compression therapy to a patient, if the change in a patient's disease state has exceeded a threshold for disease state variance. Some embodiments may select an operating mode for determining and delivering content suggestive of behavior changes, if the change in a patient's emotional state has exceeded a threshold for emotional state variance. In a seventh stage, at step 1235, a test is performed to determine if the change in the patient's emotional state exceeds the threshold for emotional state variance. If the change in the patient's emotional state exceeds the threshold for emotional state variance, in an eighth stage, at step 1240, content suggestive of behavior changes is generated, based on the patient's emotional state and the change in emotional state. In a ninth stage, at step 1245, the content suggestive of behavior changes is delivered to the patient via a user interface. Some embodiments may interact with the patient. In various implementations, the patient's response to inquiries about the patient's well-being may be recorded. If, at step 1235, the change in the patient's emotional state does not exceed the threshold for emotional state variance, the method continues to a tenth stage, at step 1250, where a test is performed to determine if the change in the patient's disease state exceeds the threshold for disease state variance. If the change in the patient's disease state exceeds the threshold for disease state variance, in an eleventh stage, at step 1255, physical therapy parameters are adapted as a function of the patient's disease state and the change in disease state. In various implementations, physical therapy may comprise compression therapy. In some embodiments, compression therapy may be designed for treatment of lymphedema. In some implementations, adapted physical therapy parameters may comprise adapted lymphedema therapy parameters.

In a twelfth stage, at step 1260, physical therapy is delivered to the patient according to adapted therapeutic parameters. If, at step 1250, the change in the patient's disease state does not exceed the threshold for disease state variance, in a thirteenth stage, at step 1265, a test is performed to determine if the patient is complying with therapy and suggested behavior changes. If the patient is not complying with therapy and suggested behavior changes, a caregiver is alerted at step 1270 to intervene in the patient's therapy, otherwise, the method continues to periodically deliver personalized compression therapy coupled with interactive delivery of emotional wellness content at step 1215, with the CTCM interacting with the patient, and sampling monitored data representative of the patient's therapy and disease state.

In some applications, the hub controller may cause suggested content to be delivered while the hub is delivering compression therapy to the patient.

In some embodiments, a patient's emotional state may be detected. Exemplary devices may determine, as a function of a patient's emotional state, content suggestive of behavior changes designed to improve the patient's emotional state.

In some implementations, a patient's disease state may be determined. In various embodiments, compression therapy parameters may be adapted as a function of a patient's disease state. A mode for determining adapted compression therapy parameters as a function of disease state, and delivering adapted compression therapy, may be selected. In various designs, a mode for determining content suggestive of behavior changes as a function of emotional state, and delivering content, may be selected. In various implementations, the therapy selection may include both compression therapy and suggestive content if the hub controller determines that the optimal treatment involves delivering both concurrently, for example. Some embodiments may determine the patient's compliance with the physician-prescribed therapy and/or suggested behavior changes to help the patient make improved lifestyle choices.

In some implementations, a caregiver may be alerted for potential intervention, if a patient's compliance with therapy or suggested behavior deviates from a prescribed target by more than a predetermined threshold.

Accordingly a device or system of devices may cooperate to provide a hub for a specific disease state that calls for compression therapy. This hub may receive information from sensors, or metrics, or from interaction with the patient, doctor, caregiver, or even processing platforms that contain data or metadata indicative of behavior of the patient that may be relevant to the specific disease state. The outputs from the hub may be in the form of actual physical compression therapy to a region of the patient's body, content delivered to promote, encourage, and guide the patient to health-directed lifestyle choices including but not limited to use of the treatment device in the prescribed manner. The observed inputs may indicate trends, changes, or levels of emotional wellness, especially for home-based therapies that are not under constant supervision by medical professionals (e.g., in a hospital, direct care facility). The hub may assess the patient's emotional state based on metrics related to an electronic signature (e.g., computer usage, unread email rates, number of messages sent), work activities, content, frequency, location and intensity of recreational or other physical movement, diet, and quality and amount of sleep, for example. The hub may also obtain emotional wellness information by direct interaction with the patient (e.g., polling with questions, voice processing and analysis, biomeasurement, motor skills and cognitive testing). The hub may monitor compliance with a therapeutic course of treatment, and take corrective action steps when the patient is not complying (e.g., deliver encouraging messages to the patient, contacting third parties such as relative or care provider). The hub can also provide positive encouragement to sustain compliance, and reward the patient with praise, for example. When the patient disease and emotional states allow, for example, the hub can reduce or eliminate unnecessary therapeutic compression sessions, while continuing to monitor emotional state, disease state, and deliver emotionally supportive content to encourage healthy lifestyle choices (e.g., do water aerobics classes 5 days per week, maintain proper diet, maintain healthy sleep patterns). If, in the case of lymphedema, a relapse occurs, the hub is on site and ready to deliver therapeutic compression to the affected limb, for example.

Accordingly, the hub may provide a local, home-based monitoring and dual mode therapy (e.g., compression therapy, emotionally supportive wellness) in a way that helps the patient to balance emotional and treatment aspects of treating the disease state of lymphedema, for example. The hub can also assess, monitor, record, track and communicate emotional state information, based on observable indicators and/or polling the patient, for example.

Accordingly, various embodiments may sense or measure inputs (e.g., bio sensing, inflation time), treat by proving compression therapy to treat a chronic predetermined condition. Some embodiments may further communicate results and receive prescribed profiles with third parties, such as a doctor or device manufacturer. In some examples, the hub may poll the patient to elicit how the patient thinks she is feeling and detect how she is actually is doing in terms of wellness based on biomeasurements. Some embodiments may also alter treatment protocols based on manual, or AI algorithms. Some embodiments may further promote compliance taking into consideration human factors. For example, some implementations may provide information regarding lifestyle changes that are targeted to improve patient health relative to the disease state. Various implementations may provide content to address the emotional aspect of the patient's state preserving a state of mind more conducive to adhering to a lifestyle and treatment protocol that will positively impact the known disease state, including but not limited to use of the in home treatment device.

Various examples may advantageously detect disengagement with therapy, and register that as non-compliance. The home based hub or system may effectively notice a small degradation in compliance or other precursor before the effects become more difficult or impossible to reverse. As such, such systems may dramatically reduce health care costs, improve patient wellness and provide automated care for emotional wellness of the patient on an outpatient basis, for example.

Although various embodiments have been described with reference to the Figures, other embodiments are possible. Some embodiments may adjust a therapy routine in response to user inputs. For example, various implementations may solicit the user to input the user's nutritional intake. In some embodiments, the user may be queried as to their subjective feelings of well-being. In some embodiments, the system may automatically record the use of a compression therapy device. A dynamic therapy calculator may adjust a therapy routine in response to user inputs.

In some embodiments, an active compression therapy dynamic treatment system may optimize a therapy regime based on user activities which may be automatically tracked by the system. For example, the dynamic treatment system may track how the user uses a compression therapy device (e.g. when does the user use the device, how long does the user use the device, does the user move while using the device). In some embodiments, the user may wear an activity tracking device. The dynamic treatment system may track the user's activity level throughout the day, for example, using such an activity tracking device, or connect with a patient's cellphone or smart monitoring devices (e.g., a FITBIT tracker, commercially available from Fitbit Inc. of Massachusetts). In some embodiments, the user may wear a heart rate monitoring device and/or a tissue monitoring device, for example. A dynamic treatment system may make a recommendation for a therapy routine based on one or more of these tracked user activities.

In some embodiments, a compression therapy dynamic treatment system may adjust a therapy regime based on information obtained from sources other than the user of an active compression therapy device. For example, some dynamic treatment systems may adjust a therapy routine based on environmental conditions. In an exemplary embodiment, a dynamic treatment system may adjust a therapy routine based on evolving standards of care (e.g., standards developed by a manufacturer and/or a physician). Some exemplary dynamic therapy systems may adjust a therapy routine based on patient population trends.

Some aspects of embodiments may be implemented as a computer system. For example, various implementations may include digital and/or analog circuitry, computer hardware, other sensors (e.g., temperature sensors), firmware, software, or combinations thereof. Apparatus elements can be implemented in a computer program product tangibly embodied in an information carrier, e.g., in a machine-readable storage device, for execution by a programmable processor; and methods can be performed by a programmable processor executing a program of instructions to perform functions of various embodiments by operating on input data and generating an output. Some embodiments can be implemented advantageously in one or more computer programs that are executable on a programmable system including at least one programmable processor coupled to receive data and instructions from, and to transmit data and instructions to, a data storage system, at least one input device, and/or at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example and not limitation, both general and special purpose microprocessors, which may include a single processor or one of multiple processors of any kind of computer. Generally, a processor will receive instructions and data from a read-only memory or a random access memory or both. The essential elements of a computer are a processor for executing instructions and one or more memories for storing instructions and data. Storage devices suitable for tangibly embodying computer program instructions and data include all forms of non-volatile memory, including, by way of example, semiconductor memory devices, such as EPROM, EEPROM, and flash memory devices; magnetic disks, such as internal hard disks and removable disks; magneto-optical disks; and, CD-ROM and DVD-ROM disks. The processor and the memory can be supplemented by, or incorporated in, ASICs (application-specific integrated circuits). In some embodiments, the processor and the member can be supplemented by, or incorporated in hardware programmable devices, such as FPGAs, for example.

In some implementations, each system may be programmed with the same or similar information and/or initialized with substantially identical information stored in volatile and/or non-volatile memory. For example, one data interface may be configured to perform auto configuration, auto download, and/or auto update functions when coupled to an appropriate host device, such as a desktop computer or a server.

In some implementations, one or more user-interface features may be custom configured to perform specific functions. An exemplary embodiment may be implemented in a computer system that includes a graphical user interface and/or an Internet browser. To provide for interaction with a user, some implementations may be implemented on a computer having a display device, such as an LCD (liquid crystal display) monitor for displaying information to the user, a keyboard, and a pointing device, such as a mouse or a trackball by which the user can provide input to the computer. For example, wearable devices, such as Google Glass or other technologies may facilitate input and/or output operations between a user and a system.

In various implementations, the system may communicate using suitable communication methods, equipment, and techniques. For example, the system may communicate with compatible devices (e.g., devices capable of transferring data to and/or from the system) using point-to-point communication in which a message is transported directly from the source to the receiver over a dedicated physical link (e.g., fiber optic link, point-to-point wiring, daisy-chain). The components of the system may exchange information by any form or medium of analog or digital data communication, including packet-based messages on a communication network. Examples of communication networks include, e.g., a LAN (local area network), a WAN (wide area network), MAN (metropolitan area network), wireless and/or optical networks, and the computers and networks forming the Internet. Other implementations may transport messages by broadcasting to all or substantially all devices that are coupled together by a communication network, for example, by using omni-directional radio frequency (RF) signals. Still other implementations may transport messages characterized by high directivity, such as RF signals transmitted using directional (i.e., narrow beam) antennas or infrared signals that may optionally be used with focusing optics. Still other implementations are possible using appropriate interfaces and protocols such as, by way of example and not intended to be limiting, USB 2.0, Firewire, ATA/IDE, RS-232, RS-422, RS-485, 802.11a/b/g/n, Bluetooth, BLE, Wi-Fi, Ethernet, IrDA, FDDI (fiber distributed data interface), token-ring networks, or multiplexing techniques based on frequency, time, or code division. Some implementations may optionally incorporate features such as error checking and correction (ECC) for data integrity, or security measures, such as encryption (e.g., WEP) and password protection.

Exemplary bio-impedance devices may determine the limb density as a function of the measured electrical impedance of biological tissue in response to an applied alternating current. Bio-impedance is based on two key concepts: 1) when a current is passed through the body, the water-containing fluids primarily conduct the electrical current. Water is found both inside the cells, intracellular fluid (ICF) and outside the cells, extracellular fluid (ECF). At low frequency, current passes through the ECF space and does not penetrate the cell membrane. At high frequencies, however, the current passes through both the ICF and ECF. 2) Impedance can be calculated from a fixed strength current being passed through the body, which is inversely proportional to the amount of fluid. By appropriate choice of signal frequency, this can be made specific for ECF or for total fluid determinations (ECF and ICF).

The various types of bio-impedance measurement include single frequency, multi-frequency and bio-impedance spectroscopy. Single frequency bio-impedance measurement is generally performed at a frequency of 50 kHz. At this frequency, the current passes through both ICF and ECF. The Single Frequency method relies on prediction equations and algorithms to calculate results. The algorithms have generally been established by having a baseline from healthy patients. However, one single algorithm is not sufficient for all patient uses. Size and total amount of fat in the body directly affect the prediction of the volume of fluids in the body.

In some embodiments, multi-frequency bio-impedance measurement involves taking impedance measurements at less than 7 frequencies. In various implementations empirical linear regression may then be used to estimate the volume of fluids in the body. In further embodiments, Bio-impedance Spectroscopy measurement may take measurements at 256 different frequencies and uses mathematical modelling to calculate the resistance at zero and infinite frequencies to determine $R_O$ and $R_{inf}$. The determination of impedance at zero frequency may be highly significant as it represents extracellular fluids alone. Using bio-impedance to determine the volume of lymph fluid in the body may be advantageous because it is non-invasive, reliable and is not harmful to the body. Bio-impedance can also be used to detect the presence of Lymphedema in the body at very early stages.

Exemplary devices may provide accurate, safe and reliable measurement of ECF fluids in a body by using multi-frequency or spectroscopy bio-impedance methods. Various implementations may use algorithms developed using numerical linear regressions to show the correlation to show the total volume of ECF present in the model. Some embodiments may use algorithms are developed by calculating the standard deviation between the measured volume and the actual volume present. The volume of ECF ($V_{ECF}$) present in the body is calculated using the equation below:

$$V_{ECF}=k_{ECF}[(H^2\sqrt{W})/R_E]^{2/3}$$

$$k_{ECF}=[((K_B{}^2\rho_{ECF}{}^2)/D_B)^{1/3}]/100$$

Measured Quantities:

H=Height of the Measured Person (cm)

W=Weight of the Measured Person (kg)

$R_E$=Extra-Cellular Resistance (Ω)=$R_0$

Constant Values:

$\rho_{ECF}$=Resistivity of Extra-Cellular Fluid (Ω·cm)

$K_B$=4.3

$D_B$=1.05 kg/liter

The electrode material and design may be key parameters that directly affect the measurements. The value of $R_E$ may be determined using regression methods. The corresponding resistance at different frequencies is determined and extrapolation performed to determine the resistance value at zero frequency ($R_0$). The more frequencies used for the interpolation, the more accurate the interpolation at zero frequency will be. In some embodiments, the number of frequencies used in a multi-frequency bio-impedance measurement may be constrained to the minimum number of frequencies required to obtain an acceptable result in a given application, where the minimum number of frequencies may be obtained by appropriate experimentation in view of the frequency-sensitive properties of the various electrode materials. The table below lists typical values of Rd and Cd for some typical electrode materials, and the corresponding magnitude impedance.

| Material | Rd | Cd | [Rd‖Cd] @ 1 kHz |
|---|---|---|---|
| Wet Ag/AgCl | 350 kΩ | 25 nF | 6 KΩ |
| Metal Plate | 1.3 MΩ | 12 nF | 13 kΩ |
| Thin Films | 550 MΩ | 220 pF | 724 kΩ |
| MEMS | 650 kΩ | Negligible | 650 kΩ |

In various implementations, a circuit for bio-impedance measurement may provide a current at either a fixed frequency or a range of frequencies depending on the selected method. An exemplary bio-impedance measurement circuit may incorporate a filtering process to eliminate noise, which affects the impedance reading, especially at lower frequencies. In some embodiments, a bio-impedance measurement circuit may integrate a method to transfer/communicate information to the user.

In various embodiments, electrodes may be incorporated at the ends of the treatment garments. In some implementations, electrodes may be made from either metallic electrodes (noble metals or stainless steel) or electrolytic gel electrodes (standard ECG electrode).

Further embodiments may be communicatively and operatively coupled with a database to track the progress of patients, output, and potentially share results. A database in some embodiments may involve a website database that the users can log in to, to track the progress of their treatment, or a smartphone application that the data can be shared with, using wireless or Bluetooth technology. In various implementations, further analysis of the data may be performed to determine how that correlates to the length of treatment. Analysis in some implementations may include extensive research and computation on the data to determine the correlation between the progress and the length of treatment, including empirical regression methods performed on the data to determine the relationship.

Various exemplary devices may use the concepts of bio-impedance to determine the volume of lymph fluid present in the body. Some embodiments, may determine the volume of lymph fluid present in the body using algorithms developed with regression methods based on the data received from testing. In other embodiments, a circuit utilizing a microcontroller and waveform generator may provide a voltage and current that may pass through the patient at a set frequency or a range of frequencies. In further embodiments, an exemplary device may determine an output waveform and phase change effective for calculating the impedance using an electric circuit or programming. Exemplary devices may include wireless/Bluetooth capabilities to transfer information to an end user. In various implementations, electrodes may be made of either metals (noble metals or stainless steel) or electrolytic gel. Some embodiments may have a system that logs the progress of treatment based on the volume measurements taken for each user.

In further embodiments, information may be provided to the user via either a website database or a phone application. Various embodiments may suggest customized treatment plans based on the progress of the current treatment plan. Various implementations may be FCC and FDA compliant.

Some embodiments may archive patient response measurements and disease state estimates to provide historical data tracking the patient's response to treatment over time. Various implementations may analyze historical patient response measurement to identify trends. Trends may include disease progression or remission, disease cessation, or variance in patient performance or wellness. Some implementations may incorporate additional data in the analysis of patient progress or disease state, including tracking patient mood using techniques including voice recognition or patient responses to inquiries about the patient's well-being.

Trend analysis may be used in various embodiments to adapt treatment protocols as the patient's disease state improves or worsens. Exemplary devices may increase frequency or duration of treatment, vary pressure, alert a physician, or adapt treatment in other ways as appropriate if a patient's disease state trend is determined to be worsening, or not improving according to reference data. In various embodiments, reference data may include standards of care, such as reference disease state levels. In some implementations, an exemplary device may determine appropriate actions including modifications to treatment or alerts, as a function of disease state and standards of care. For example, in a limb treatment scenario an exemplary device may determine the lymph concentration has increased beyond a standardized range for the patient and the progress expected, and the determination may trigger the activation of a more aggressive treatment.

Some embodiments may provide guidance to the patient, for managing chronic conditions, such as lymphedema, based on analysis of disease state and patient performance trends. Exemplary devices may suggest modifications to patient lifestyle choices directed to improving treatment outcome when trend analysis determines treatment is not progressing as expected. The suggested modifications to lifestyle choices may include changes to treatment location, treatment time, diet, eating habits, or sleeping schedule, determined as a function of disease state trends and standards of care. Additional embodiments may suggest, for example, that a patient may resume activity previously restricted by a physician, when trend analysis determines the patient's condition has improved. Further embodiments may incorporate artificial intelligence techniques to determine appropriate support content that may benefit the patient and help the patient manage and treat a chronic disease. Support content may include instructional content to help the patient with treatment, and psychological support content to help the patient improve their sense of well-being. In various implementations appropriate support content may be determined as a function of the patient's disease state, standards of care, expected prognosis, historical data, or other factors.

In one exemplary aspect, a dynamic treatment apparatus may include an output system adapted to provide system output to interact with the patient and apply a predetermined treatment protocol to the patient, and an input system adapted to receive a system input representative of a patient response and measurement of a treatment outcome responsive to the applied treatment protocol. A controller is operatively coupled to the input system to receive the system input, and operatively coupled to the output system to apply the predetermined treatment protocol to the patient. A memory device is operatively coupled to the controller and containing instructions, that when executed by the controller, cause the controller to perform operations to apply the treatment to a patient and suggest changes to treatment protocols or patient activities as a function of treatment outcome and the patient's disease state. The operations include (i) apply the treatment protocol to the patient, (ii) determine the treatment outcome and the patient's disease state based on the received system input, (iii) suggest changes in lifestyle. In various examples, the suggested changes may include modifications to treatment location, treatment time, diet, eating habits, or sleeping schedule. The modifications may be based on the determined disease state and a predetermined standard of care. The operations to suggest changes may further include interactive delivery of supportive palliative medical, psychological, emotional, or counseling content to a patient based on the determined disease state and the predetermined standard of care. The apparatus also includes a user interface operatively coupled to the controller to interact with the patient regarding the generated suggested changes.

In various embodiments of the apparatus, the operations may include: estimate the patient's disease state based on the received system input, and determine the supportive content as a function of the estimated disease state and the predetermined standards of care; archive and analyze patient responses to queries and measurements of treatment outcome to identify disease state trends; or, receive, at the memory device, information that defines the predetermined standards of care. The user interface may receive, from the controller, display information that, when displayed on a display device, presents to the user at least some of the generated suggested changes.

The operations may further include: determine a personalized profile of a patient as a function of sensor input data or subjective input data; determine suggested changes to the treatment protocol and suggested changes to patient activity as a function of the personalized profile of a patient and prescriptive data; or, determine suggested changes to the treatment protocol and suggested changes to patient activity as a function of the personalized profile of a patient and historical data.

In another exemplary aspect, a treatment method may include providing an output system adapted to provide system output to interact with the patient and apply a predetermined treatment protocol to the patient, providing an input system adapted to receive a system input representative of a patient response and measurement of a treatment outcome responsive to the applied treatment protocol, and providing a controller operatively coupled to the input system to receive the system input, and operatively coupled to the output system to apply the predetermined treatment protocol to the patient. The method may also include providing a memory device operatively coupled to the controller and containing instructions, that when executed by the controller, cause the controller to perform operations to apply the treatment to a patient and suggest changes to treatment protocols or patient activities as a function of treatment outcome and the patient's disease state. The operations may include: (i) apply the treatment protocol to the patient; (ii) determine the treatment outcome and the patient's disease state based on the received system input; and, (iii) suggest changes in lifestyle, the suggested changes comprising modifications to treatment location, treatment time, diet, eating habits, or sleeping schedule, based on the determined disease state and a predetermined standard of care.

In various implementations of the method, the operations to suggest changes may further include interactive delivery of supportive palliative medical, psychological, emotional, or counseling content to a patient based on the determined disease state and the predetermined standard of care.

In another exemplary aspect, a method of operating a compression therapy controller module (CTCM) as a system hub configured to deliver personalized compression therapy coupled with interactive delivery of emotional wellness content to treat a disease state known to benefit from active compression therapy includes several steps. One step is updating a current disease state in the patient based on a first input signal sampled during operation of a compression therapy device, the compression therapy device being adapted to treat the known disease state, the first signal having a predetermined correlation to known effective treatments. Another step is updating a current emotional state of the patient based on a second input signal comprising an indicator having a predetermined correlation with emotional state of a patient with a disease state known to benefit from compression therapy. Another step is, based on the current emotional state of the patient, generating content to deliver to the patient, the generated content comprising information that indicates a behavioral change that the patient can make to improve upon the current disease state or the current emotional state of the patient. Another step is, based on the current emotional state and current disease state of the patient, selecting a therapeutic mode to apply to the patient, the therapeutic mode selection being made between a first mode and a second mode. In the first mode, the controller causes a compression therapy device operably connected to the controller to deliver a compression therapy protocol to physically treat the disease state of the patient. In the second mode, the controller causes the generated content to be delivered to the patient.

In various embodiments of the method, the first input signal may include a pressure signal indicative of a pressure in an inflatable chamber configured to deliver compression therapy to a region of the patient's body. The first input signal may include a measured inflation time of an inflatable chamber configured to deliver compression therapy to a region of the patient's body. The second input signal may include a voice monitoring signal, the method further comprising updating the current emotional state of the patient by analyzing the voice monitoring signal to detect indicia of the emotional state of the patient.

The method may include updating the current disease state of the patient by analyzing the voice monitoring signal to detect indicia having a predetermined correlation to the disease state. The second input signal may include an electronic signature indicia. The electronic signature indicia may include metrics that indicate a variance in the patient's normal electronic communication usage patterns, wherein the variance metrics exceed a predetermined threshold relative to historic electronic communication usage patterns.

The second input signal may include indicia of activity level patterns relative to time of day. The second input signal may include measured sleep patterns, indicia of work activity patterns, measurement of total computer use patterns, patient-reported information about how the patient feels, tracking information indicative of a measure of exercise, tracking information indicative of a measure of movement.

The mode selection comprises selecting both the first mode and the second mode. The method may include programming the controller to repeat the therapeutic mode selection at least once per day. The method may include actuating a compression therapy device operatively coupled to deliver therapy to the patient by inflating and deflating at least one chamber according to a predetermined compression therapy profile. The method may include updating the compression therapy profile for the patient as a function of the first input signal and the second input signal. The generated content may include interactively delivered supportive palliative medical, psychological, emotional, or counseling content to the patient based on a predetermined standard of care for lymphedema. The method may include, at the controller, receiving, from a remote server over a communication network, updates to the predetermined standard of care for lymphedema.

In certain embodiments, a treatment device or system may update treatment protocols based on a known disease state and a sensed patient state. Some embodiments include a device that may use known disease state and patient state to suggest lifestyle activities appropriate to the patient. Furthermore, some implementations may include a device that uses known disease state and patient state to suggest lifestyle activity, or to provide interactions that improve and maintain a patient's mental state of being to help ensure compliance to treatment requirements and lifestyle suggestions. Accordingly various embodiments may be responsive to whole patient care needs, including human factors, and may advantageously reduce health care costs for compression therapy patients, and improve disease state and patient state wellness outcomes.

*1. In an illustrative aspect, a method of operating a compression therapy controller module (CTCM) as a system hub configured to deliver personalized compression therapy coupled with automated management of an emotional state of a patient may include delivering emotional wellness content to promote compliance with a prescribed treatment protocol or desired emotional state for treating a disease state that is known to benefit from active compression therapy.*

*2. The method may include identifying a predetermined target emotional state profile associated with treatment of a current disease state of the patient who has a prescribed treatment protocol that includes receiving therapy from a compression therapy device adapted to treat the disease state.*

*3. The method may include assessing, with the device, a current emotional state of the patient based on an emotional input signal received by the device. The emotional input signal may include an indicator having a predetermined correlation with the current emotional state of the patient with the disease state.*

*4. The method may include assessing, with the device, a current physical state of the patient based on a physical input signal received by the device. The physical input signal may include a physical indicator having a predetermined correlation with the current emotional state of the patient with the disease state. The physical input signal may include at least one human factor signal associated with the disease state. The human factor signal may include measurement of limb volume. The human factor signal may include measurement of limb density of the patient.*

*5. The method may include determining a variance between the target emotional state profile and the assessed current emotional state. The method may include generating, based on the determined variance, a content to deliver to the patient. The generated content may include information that the patient can consume to reduce the variance. The method may include delivering the generated content to the patient.*

A number of implementations have been described. Nevertheless, it will be understood that various modification may be made. For example, advantageous results may be achieved if the steps of the disclosed techniques were performed in a different sequence, or if components of the disclosed systems were combined in a different manner, or if the components were supplemented with other components. Accordingly, other implementations are contemplated within the scope of the following claims.

What is claimed is:

1. A method of operating a compression therapy controller module (CTCM) as a system hub configured to deliver personalized compression therapy coupled with automated management of an emotional state of a patient by delivering emotional wellness content to promote compliance with a prescribed treatment protocol or desired emotional state for treating a disease state that is known to benefit from active compression therapy, the method comprising:

(a) identifying a predetermined [optimal] *target* emotional state profile associated with treatment of a current disease state of the patient who has a prescribed treatment protocol that includes receiving therapy from a compression therapy device adapted to treat the disease state;

(b1) assessing, with the device, a current emotional state of the patient based on an emotional input signal received by the device, the emotional input signal comprising an indicator having a predetermined correlation with the current emotional state of the patient with the disease state;

(b2) assessing, with the device, a current physical state of the patient based on a physical input signal received by the device, the physical input signal comprising (1) a physical indicator having a predetermined correlation with the current emotional state of the patient with the disease state, and (2) at least one human factor signal associated with the disease state, wherein the human factor signal comprises [a] *at least one of:* measurement of limb volume or *measurement of* limb density of the patient;

(c) determining a variance between the [optimal] *target* emotional state profile and the assessed current emotional state;

(d) based on the determined variance, generating content to deliver to the patient, the generated content comprising information that the patient can consume to reduce the variance; and, (e) delivering the generated content to the patient.

2. The method of claim 1, wherein the physical input signal comprises at least one biosense signal associated with the disease state.

3. The method of claim 2, wherein the biosense signal comprises a measurement of at least one vital sign of the patient.

4. The method of claim 1, wherein the human factor signal further comprises a measurement of physical movement of the patient.

5. The method of claim 1, wherein the human factor signal further comprises a voice monitoring signal recording indicia of the patient's voice that have a predetermined correlation with the emotional state of the patient.

6. The method of claim 1, further comprising assessing, with the device, a current lifestyle of the patient based on a lifestyle input signal received by the device, the lifestyle input signal comprising a lifestyle indicator having a predetermined correlation with the current emotional state of the patient with the disease state.

7. The method of claim 6, wherein the lifestyle input signal comprises information about a sleep metric for the patient, wherein the sleep metric is associated with the disease state.

8. The method of claim 6, wherein the lifestyle input signal comprises information about a diet metric for the patient, wherein the diet metric is associated with the disease state.

9. The method of claim 6, wherein the lifestyle input signal comprises information about an exercise metric for the patient, wherein the exercise metric is associated with the disease state.

10. The method of claim 6, wherein the lifestyle input signal comprises information about an electronic signature indicia for the patient, wherein the electronic signature indicia is associated with the disease state.

11. The method of claim 10, wherein the electronic signature indicia comprise metrics that indicate a variance in the patient's normal electronic communication usage patterns, wherein the variance metrics exceed a predetermined threshold relative to historic electronic communication usage patterns of the patient.

12. The method of claim 6, wherein the lifestyle input signal comprises indicia of activity level patterns relative to time of day.

13. The method of claim 1, further comprising: (f) repeating steps (b)-(e) according to a prescribed treatment schedule.

14. The method of claim 1, wherein if the determined variance exceeds a predetermined threshold, the device generates a notification message for transmission to a third party care provider of the patient.

15. The method of claim 1, further comprising receiving, at the device, updated information from a remote server, wherein the device is configured to modify the treatment protocol for the patient based on the updated information.

16. The method of claim 1, further comprising actuating the compression therapy device operatively coupled to deliver therapy to the patient by inflating and deflating at least one chamber in the device according to a predetermined compression therapy profile.

*17. The method of claim 1, wherein the disease state comprises lymphedema.*

* * * * *